US009753934B2

(12) United States Patent
Shapiro et al.

(10) Patent No.: US 9,753,934 B2
(45) Date of Patent: *Sep. 5, 2017

(54) METHOD AND SYSTEM FOR METADATA MODIFICATION

(71) Applicant: Alan Joshua Shapiro, Chappaqua, NY (US)

(72) Inventors: Alan Joshua Shapiro, Chappaqua, NY (US); Robert Gezelter, Flushing, NY (US)

(73) Assignee: Alan Joshua Shapiro, Chappaqua, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,386

(22) Filed: Mar. 8, 2016

(65) Prior Publication Data
US 2016/0188583 A1    Jun. 30, 2016

Related U.S. Application Data

(62) Division of application No. 13/826,392, filed on Mar. 14, 2013, now Pat. No. 9,286,308.

(51) Int. Cl.
*G06F 17/30* (2006.01)

(52) U.S. Cl.
CPC .... *G06F 17/3012* (2013.01); *G06F 17/30115* (2013.01); *G06F 17/30117* (2013.01); *G06F 17/30138* (2013.01); *G06F 17/30371* (2013.01)

(58) Field of Classification Search
CPC ........................ G06F 17/3012; G06F 17/30115
USPC .......................................................... 707/692
See application file for complete search history.

(56) References Cited

U.S. PATENT DOCUMENTS

| 4,481,606 | A | 11/1984 | Nozawa et al. |
| 5,196,970 | A | 3/1993 | Seko et al. |
| 5,537,592 | A | 7/1996 | King et al. |
| 5,794,052 | A | 8/1998 | Harding |

(Continued)

OTHER PUBLICATIONS

Microsoft Corporation, "entry for 'install' (in Microsoft Computer Dictionary, Fifth Edition)", "Microsoft Computer Dictionary, Fifth Edition", May 1, 2002.

(Continued)

*Primary Examiner* — Jensen Hu
(74) *Attorney, Agent, or Firm* — Jonathan M. Rixen; Lemaire Patent Law Firm, P.L.L.C.

(57) ABSTRACT

The present invention provides a method for modifying a first storage medium having a plurality of files, the method including providing a first modification tool; operatively coupling the first storage medium to the modification tool, wherein the operatively coupling includes bypassing a first operating system used to access the plurality of files; and dematerializing, using the first modification tool, at least a first file to form one or more dematerialized files. In some embodiments, the present invention provides a modification system for modifying a first storage medium having a plurality of files, the system including a first modification tool that includes an attachment module configured to operatively couple the modification tool to the first storage medium such that a first operating system used to access the plurality of files is bypassed; and a dematerialization module configured to dematerialize at least a first file to form one or more dematerialized files.

20 Claims, 18 Drawing Sheets

(56) References Cited

U.S. PATENT DOCUMENTS

| | | |
|---|---|---|
| 6,243,766 B1 | 6/2001 | Sliger et al. |
| 6,247,024 B1 | 6/2001 | Kincaid |
| 6,247,128 B1 | 6/2001 | Fisher et al. |
| 6,269,343 B1 | 7/2001 | Pallakoff |
| 6,454,572 B1 | 9/2002 | Konetski et al. |
| 6,512,526 B1 | 1/2003 | McGlothlin et al. |
| 6,543,047 B1 | 4/2003 | Vrhel, Jr. et al. |
| 6,681,391 B1 | 1/2004 | Marino et al. |
| 6,757,783 B2 | 6/2004 | Koh |
| 6,807,665 B2 | 10/2004 | Evans et al. |
| 6,823,376 B1 | 11/2004 | George et al. |
| 6,868,496 B2 | 3/2005 | Sales et al. |
| 6,874,092 B1 | 3/2005 | Motoyama et al. |
| 6,874,143 B1 | 3/2005 | Murray et al. |
| 6,889,232 B2 | 5/2005 | Pudipeddi et al. |
| 6,904,592 B1 | 6/2005 | Johnson |
| 6,990,636 B2 | 1/2006 | Beauchamp et al. |
| 6,993,642 B2 | 1/2006 | Burkhardt et al. |
| 7,039,594 B1 | 5/2006 | Gersting |
| 7,092,949 B2 | 8/2006 | Ohgake |
| 7,143,067 B1 | 11/2006 | Cheston et al. |
| 7,260,845 B2 | 8/2007 | Kedma et al. |
| 7,266,804 B2 | 9/2007 | Hogg et al. |
| 7,330,967 B1 | 2/2008 | Pujare et al. |
| 7,330,997 B1 | 2/2008 | Odom |
| 7,370,318 B1 | 5/2008 | Howe et al. |
| 7,398,524 B2 | 7/2008 | Shapiro |
| 7,409,675 B2 | 8/2008 | Brumme et al. |
| 7,415,707 B2 | 8/2008 | Taguchi et al. |
| 7,464,176 B2 | 12/2008 | Cohen et al. |
| 7,565,695 B2 | 7/2009 | Burtscher |
| 7,567,541 B2 | 7/2009 | Karimi et al. |
| 7,571,176 B2 | 8/2009 | Shapiro |
| 7,577,934 B2 | 8/2009 | Anonsen et al. |
| 7,703,090 B2 | 4/2010 | Napier et al. |
| 7,770,165 B2 | 8/2010 | Olson et al. |
| 7,921,082 B2 | 4/2011 | Mukker |
| 7,953,669 B2 | 5/2011 | Ohbitsu |
| 8,074,214 B2 | 12/2011 | Isaacson et al. |
| 8,108,429 B2 | 1/2012 | Sim-Tang et al. |
| 8,224,784 B2 | 7/2012 | Henrickson |
| 8,244,989 B2 | 8/2012 | Benavides |
| 8,429,331 B2 | 4/2013 | Munegowda et al. |
| 8,555,199 B2 | 10/2013 | Kurtz et al. |
| 2002/0069324 A1 | 6/2002 | Gerasimov |
| 2003/0037326 A1 | 2/2003 | Burkhardt et al. |
| 2003/0046372 A1 | 3/2003 | Traxler |
| 2003/0158926 A1 | 8/2003 | Kroening |
| 2005/0055688 A1 | 3/2005 | Barajas et al. |
| 2005/0125524 A1 | 6/2005 | Chandrasekhar et al. |
| 2005/0198628 A1 | 9/2005 | Graham et al. |
| 2006/0048139 A1 | 3/2006 | Nakamura |
| 2006/0053419 A1 | 3/2006 | Barfield et al. |
| 2006/0106880 A1* | 5/2006 | Wang ............... G06F 17/30138 |
| 2006/0200656 A1 | 9/2006 | Cardinell et al. |
| 2006/0277183 A1 | 12/2006 | Nichols et al. |
| 2007/0028231 A1 | 2/2007 | Kelso et al. |
| 2007/0185936 A1 | 8/2007 | Derk et al. |
| 2009/0031296 A1 | 1/2009 | Boudreau et al. |
| 2009/0254899 A1 | 10/2009 | Shlomai et al. |
| 2009/0300578 A1 | 12/2009 | Neil |
| 2011/0271273 A1 | 11/2011 | Dumais et al. |
| 2013/0018852 A1* | 1/2013 | Barton ............. G06F 17/30117 707/692 |
| 2014/0214782 A1* | 7/2014 | Verma .............. G06F 17/30371 707/695 |

OTHER PUBLICATIONS

Digital Equipment Corporation, "RSX-11 Utilities Manual", "Digital Equipment Corporation", Jun. 1979.

* cited by examiner

AREAS AFFECTED BY CONVENTIONAL ERASE

AREAS ZEROED BY DEMATERIALIZATION ACCORDING TO SOME EMBODIMENTS OF THE PRESENT INVENTION

AREAS AFFECTED BY CONVENTIONAL ERASE

AREAS ZEROED BY DEMATERIALIZATION ACCORDING TO SOME EMBODIMENTS OF THE PRESENT INVENTION

METHOD AND SYSTEM FOR METADATA MODIFICATION

CROSS-REFERENCE TO RELATED APPLICATIONS

This application is a divisional of U.S. patent application Ser. No. 13/826,392 filed on Mar. 14, 2013 by Alan Joshua Shapiro, et al., titled "SYSTEM AND METHOD FOR METADATA MODIFICATION" (which issued as U.S. Pat. No. 9,286,308 on Mar. 15, 2016), which is incorporated herein by reference in its entirety.

This application is related to:

U.S. patent application Ser. No. 11/428,346 filed Jun. 30, 2006 (issued as U.S. Pat. No. 7,398,524 on Jul. 8, 2008) entitled "APPARATUS AND METHOD FOR SUBTRACTIVE INSTALLATION";

U.S. patent application Ser. No. 11/428,359 filed Jun. 30, 2006 (issued as U.S. Pat. No. 7,712,094 on May 4, 2010) entitled "METHOD AND APPARATUS FOR REPLICATING A PANOPLEX ONTO A STORAGE MEDIUM FROM A MASTER";

U.S. patent application Ser. No. 11/428,374 filed Jun. 30, 2006 (issued as U.S. Pat. No. 8,286,159 on Oct. 9, 2012) entitled "METHOD AND APPARATUS FOR GRYPHING A DATA STORAGE MEDIUM";

U.S. patent application Ser. No. 11/428,376 filed Jun. 30, 2006 (issued as U.S. Pat. No. 8,321,859 on Nov. 27, 2012) entitled "METHOD AND APPARATUS FOR DISPENSING ON A DATA-STORAGE MEDIUM CUSTOMIZED CONTENT COMPRISING SELECTED ASSETS";

U.S. patent application Ser. No. 12/022,118 filed Jan. 29, 2008 (issued as U.S. Pat. No. 8,266,615 on Sep. 11, 2012) entitled "METHOD AND APPARATUS FOR DELIVERING PERCEPTA";

U.S. patent application Ser. No. 13/610,517 filed Sep. 11, 2012 (issued as U.S. Pat. No. 9,176,971 on Nov. 3, 2015) entitled "METHOD AND APPARATUS FOR SUBTRACTIVE INSTALLATION";

U.S. patent application Ser. No. 12/144,598 filed on Jun. 23, 2008 (issued as U.S. Pat. No. 8,245,185 on Aug. 14, 2012) and entitled "SYSTEM AND METHOD FOR SOFTWARE DELIVERY";

U.S. patent application Ser. No. 13/565,540 filed Aug. 2, 2012 (issued as U.S. Pat. No. 8,661,406 on Feb. 25, 2014) entitled "METHOD AND SYSTEM FOR SOFTWARE DELIVERY";

U.S. patent application Ser. No. 11/611,886 filed on Dec. 17, 2006 (issued as U.S. Pat. No. 7,571,176 on Aug. 4, 2009) and entitled "SELECTIVE FILE ERASURE USING METADATA MODIFICATIONS";

U.S. patent application Ser. No. 12/534,839 filed on Aug. 3, 2009 (issued as U.S. Pat. No. 7,856,451 on Dec. 21, 2010) and entitled "SELECTIVE FILE ERASURE USING METADATA MODIFICATIONS";

U.S. patent application Ser. No. 12/973,898 filed on Dec. 20, 2010 (issued as U.S. Pat. No. 8,099,437 on Jan. 17, 2012) and entitled "METHOD AND APPARATUS FOR SELECTIVE FILE ERASURE USING METADATA MODIFICATIONS";

U.S. patent application Ser. No. 13/325,820 filed Dec. 14, 2011 (issued as U.S. Pat. No. 8,521,781 on Aug. 27, 2013) entitled "APPARATUS AND METHOD FOR SELECTIVE FILE ERASURE USING METADATA MODIFICATIONS";

U.S. Provisional Patent Application 60/753,635 filed Dec. 22, 2005 entitled "RAPID DISPENSING OF STORED DIGITAL CONTENT"; and U.S. Provisional Patent Application 60/747,201 filed May 14, 2006 entitled "APPARATUS AND METHOD FOR SELECTIVELY DISPENSING SOFT ASSETS VIA SUBTRACTIVE INSTALLATION", each of which is hereby incorporated by reference in its entirety.

FIELD OF THE INVENTION

The present invention relates to systems and methods for digital data processing, and more particularly to direct manipulation of metadata associated with the digital data being processed.

BACKGROUND OF THE INVENTION

Computer operating systems (OS) employ file systems to map the complexity of physical or virtual storage hardware to logical abstractions that can be easily manipulated. File systems are part of the storage stack of modern systems, and may be implemented as kernel services, user services, firmware, network services, virtualized services, and more, as well as combinations thereof. Modern file systems use directories (a.k.a. folders) and directory entries to keep track of the file names on a file system as stored within diverse storage media, including magnetic hard drives, Flash memory drives and other solid-state devices, floppies, tapes, or optical media such as compact disks, DVDs, Blu-ray, and the like. In such file systems, the directory entry for a file typically points to a list of blocks that contain the file's data. The exact format of the directory entry and block list varies depending on the specific type of file system (e.g., Linux ext2, FAT32, HFS+, NTFS, or UDF), but this general approach is widely used because it is simple and provides access to files and their contents with a minimum of overhead.

As used herein, "File Allocation Table" or "FAT" (e.g., FAT, FAT16, FAT32, exFAT, or the like) is a file system designed by Microsoft Corporation that uses index tables (i.e. file allocation tables) that contain entries for each cluster or unit of disk space allocation for files and directories.

As used herein, "second extended filesystem" or "Linux ext2" is a file system for the Linux operating-system kernel.

As used herein, "fast file system" or "FFS" is a file system for the Berkeley Software Design (BSD) operating-system kernels.

As used herein, "Unix file system" or "UFS" is a file system for the BSD and Solaris operating-system kernels.

As used herein, "ZFS" is a file system for the Solaris (now Oracle) operating-system kernels.

As used herein, "Hierarchical File System Plus" or "HFS+" is a file system developed by Apple Inc. as the primary file system used in Macintosh computers or other systems running Mac OS. It is also one of the formats used by the iPod digital music player.

As used herein, "New Technology File System" or "NTFS" is a proprietary file system developed by Microsoft Corporation for its Windows line of operating systems.

As used herein "Universal Disk Format" or "UDF" is an open vendor-neutral file system for computer data storage for a broad range of media including DVDs and new optical disc formats.

As used herein, a "kernel" is the main component of a computer operating system that bridges between application and the actual data processing done at the hardware level.

As used herein, "metadata" is data and information used to describe files including directory information, registry information, namespace information, superblocks, cluster groups (e.g., FAT cluster information), inodes, inode and block bitmaps, journals, and the like.

As used herein, "erasing" (also referred to herein as "deleting" or "conventional erasing" or "conventional deleting") refers to the conventional process that causes transitions from normal operating-system-mediated data and program availability, to the loss of availability and gain of related storage space. In some operating systems, such as Unix, conventional erasing is referred to as "unlinking".

As used herein, "destructive conventional erasing" (also referred to herein as "destructive conventional deleting") refers to overwriting a file's data blocks one or more times with a known patterns, such as all ones or all zeroes, or random data, ensuring that the contents cannot be recovered.

As used herein, "dematerialize" means to render a file inaccessible, but not destroy the data blocks of the file, nor release the data blocks associated with the file for reallocation. For example, in some embodiments, dematerializing a file includes modifying metadata associated with a file such that the file cannot be reconstituted by reading the file's metadata and such that the file's data blocks are marked as unavailable (sometimes referred to herein as "occupied").

As used herein, "materialize" is the reverse of dematerialize—that is, "materialize" means to make a file reappear precisely as the file appeared prior to dematerialization. Therefore, as used herein, dematerialization is considered to be a reversible process.

As used herein, an "irreversible dematerialization" is a process which renders a file inaccessible and releases the data blocks associated with the file for reallocation.

As used herein, "mounting" refers to making a storage medium (e.g., any non-volatile or volatile, read-write or read-only storage medium such as magnetic hard drives, floppies, CDs and DVDs, Flash, RAM, networks and cloud servers, tapes, Shingled devices, Phase Change Memory devices, and the like) operatively coupled to a computer accessible through the computer's file system. A Microsoft Windows operating system generally automatically mounts any storage medium that is attached to a computer running the Windows operating system. Similarly, OS X (Apple Inc.), Linux, and others may also automatically mount media that becomes available to their respective operating systems Often, it is necessary to conventionally delete files from a file system for various reasons, including the need to free up space they are using, the need to replace the file with a more recent version, and the need to remove the file so that its data will no longer be accessible to users of the file system. In order to conventionally delete a file, most file systems accomplish at least two tasks: marking the file's directory entry as "unused," and making the data blocks that the file was using available to subsequently created files. For some file systems, additional information may also be marked as unused or freed, such as inodes, block bitmaps, indirect data blocks, and more.

If the goal of conventionally deleting the file is to ensure that nobody can ever recover the data contained in the file, file systems perform a destructive conventional erase that overwrites the file's data blocks one or more times with a known pattern such as all ones, all zeroes, random data, a combination thereof, or the like, ensuring that the contents cannot be recovered. While this approach is very secure, it is also very slow. For example, a destructive conventional erase of all of the files on a terabyte hard drive could require many hours to overwrite all the data.

Instead, many modern file systems take a much simpler, but less secure, approach: they mark directory entries as "unused" and leave most of the other data on the disk untouched. This approach sets a status flag in the directory entry, changing a single word or other small amount of information on disk, and writes the directory entry back to disk. At this point, the file is considered conventionally deleted from the point of view of the file system and the directory entry is available for reuse for future files that might be created or written, but the entry is largely unchanged otherwise.

In conventional systems, after marking the directory entry as "unused," the file system makes the blocks that the file was using available for use by other files. This can be done in several ways, the most common of which is a bitmap or a free list. In file systems such as Linux ext2, a bitmap record uses a single bit for each allocation unit (an allocation unit consists of one or more blocks) in the file system, with one value (1, for example) indicating that the corresponding space is free, and the other value (0) indicating that the corresponding space is incorporated into a file and thus unavailable for use. In such a system, the file system frees the space associated with a file by setting the bits associated with the space to 1. This marking is arbitrary but consistent within a file system; NTFS uses the reverse convention. In file systems such as Ext4 (fourth extended filesystem, a journaling file system for Linux), XFS (a high-performance journaling file system created by Silicon Graphics, Inc.), BTRFS (B-tree file system, a General Public License (GPL) experimental copy-on-write file system for Linux), and others, an extent (e.g., start+end block#) is used rather than a bitmap.

No other activity is typically necessary for conventional erasing; thus, file systems concerned with efficiency do not destroy the structures in the blocks themselves that describe the relationship of the blocks to the now-conventionally deleted file. A major drawback of a conventional delete (in situations where it is desired to prevent recovery of the conventionally deleted file) is that it is relatively straightforward to recover a file that has been conventionally deleted if no other files have reused the directory entry or media blocks (i.e., there is a window of opportunity to recover a file fully after it has been conventionally deleted; this window closes when and if the directory and/or data blocks of the file have been recycled). In file systems such as UDF, a list of blocks that are available is maintained (UDF actually uses extents—ranges of blocks—rather than individual block numbers, but the approach is the same). The identifiers for blocks that were used in the now-conventionally deleted file are added to the list of blocks available for reuse without necessarily altering the data within the blocks themselves. Not changing block content makes it straightforward to recover the file and its contents using the flagged directory entry and associated (unmodified) block pointers, as long as the data blocks have not been reallocated to another file.

Another problem associated with conventional erasing is that conventional erasing is done via standard operating system commands (often called "system calls"), which make the process inefficiently slow. Conventional erasing is slow because it acts on only one file at a time with independent operating system commands that have long setup latencies.

When the software loaded is valuable and owners are concerned about potential piracy, conventional erase is not adequate.

U.S. Pat. No. 7,565,695 to Michael Burtscher (hereinafter, "Burtscher"), titled "SYSTEM AND METHOD FOR DIRECTLY ACCESSING DATA FROM A DATA STORAGE MEDIUM" issued Jul. 21, 2009, and is incorporated herein by reference. Burtscher describes systems and methods for scanning files for pestware on a protected computer. In one variation, locations of each of a plurality of files in a file storage device of the protected computer are identified while substantially circumventing an operating system of the protected computer. Information from each of the plurality of files is retrieved and analyzed so as to determine whether any of the plurality of files are potential pestware files. In variations, the operating system is circumvented while the information from each of the plurality of files is retrieved. In other variations, before information is retrieved from each of the plurality of files, a listing of the plurality of files is sorted according to the locations of the files on the storage device so as to reduce, even further, the time required to access the plurality of files.

U.S. Patent Application Publication 2006/0277183 to Tony Nichols et al. (hereinafter, "Nichols et al."), titled "SYSTEM AND METHOD FOR NEUTRALIZING LOCKED PESTWARE FILES" published Dec. 7, 2006, and is incorporated herein by reference. Nichols et al. describe systems and methods for scanning and deleting pestware on a protected computer. In one variation, the presence of a pestware file on the storage device is detected while an operating system of the protected computer is limiting access to the pestware file via the operating system. In order to mitigate any undesirable consequences the pestware might cause, a listing of a plurality of pointers to data for the pestware file is altered while the operating system continues to limit access to the file via the operating system. In this way, the operating system will be unable to locate and launch the pestware file. In systems where the files are organized in an NTFS format, a master file table (MFT) bitmap may be removed as well.

U.S. Pat. No. 5,794,052 to Henry N. Harding (hereinafter, "Harding"), titled "METHOD OF SOFTWARE INSTALLATION AND SETUP" issued Aug. 11, 1998, and is incorporated herein by reference. Harding describes a method for reducing the time needed for setting up a computer system in a user selected language version of a disk operating system by pre-installing a plurality of modules for different language versions of disk operating systems. Upon initial power on by an end user, a minimal disk operating system runs a software setup program which installs the end user selected language version of the disk operating system and merges certain factory loaded files into the user selected language operating system. A software installation program is then run which implements the changes necessitated by each of the modules for proper operation thereby resulting in a disk operating system that is properly configured for the operation of the combination of software programs. The computer system is then re-booted to implement the changes to the configuration of the disk operating system.

U.S. Pat. No. 6,681,391 to Phillip J. Marino et al. (hereinafter, "Marino et al."), titled "METHOD AND SYSTEM FOR INSTALLING SOFTWARE ON A COMPUTER SYSTEM" issued Jan. 20, 2004, and is incorporated herein by reference. Marino et al. describe a method and system for installing software on a computer that generates an installation order that ensures that a component required for the functioning of another component is already installed. Furthermore, it makes possible generating good installation orders to allow related components, e.g., in a software suite, to be installed close together, thus reducing disk swapping. The method and system take into account the existing configuration on a computer and allow removal of components along with dynamic reconfiguration of a computing system in response to a user's choice of an application program to launch. In accordance with the invention, preferably a developer includes information about the component's relationship with other components, e.g., a specific requirement for a preinstalled component or a requirement that a particular component not be present, thus requiring its removal. To remove the possibility of a single identifier referring to more than one component, the preferred embodiments of the Marino et al. invention use globally unique identifiers to label individual components.

U.S. Pat. No. 7,143,067 to Richard W. Cheston et al. (hereinafter, "Cheston et al."), titled "SYSTEM AND METHOD FOR INSTALLING PERSONAL COMPUTER SOFTWARE" issued Jan. 20, 2004, and is incorporated herein by reference. Cheston et al. describe a system and method for installing a customized set of software on a personal computer, tailored to the requirements of the prospective user and avoiding unnecessary software and attendant license fees. Software (all that may be desired) in unusable form is loaded onto the personal computer then selected software (that which a particular user may require and/or desire) is converted (decompressed and/or decrypted) to produce usable versions of the selected software while the other software may be erased, if desired, to free up space in storage. The selection of software is done on the user's function (department and/or mission) and may be supplemented by a user selection from a menu, based on a selection utility.

U.S. Patent Application Publication 2003/0037326 to Ryan Burkhardt et al. (hereinafter, "Burkhardt et al."), titled "METHOD AND SYSTEM FOR INSTALLING STAGED PROGRAMS ON A DESTINATION COMPUTER USING A REFERENCE SYSTEM IMAGE" published Feb. 20, 2003, and is incorporated herein by reference. Burkhardt et al. describe a computerized method and system for installing programs on a destination computer. A reference computer having an operating system installed thereon stores one or more partially installed, staged programs and/or one or more fully installed programs. The operating system, installed programs, and staged programs define a reference image that is copied to a destination computer. With a configuration file script, a user selects at least one of the staged programs for installation on the destination computer. The script further directs an installation utility to attach the selected program to complete the installation thereof on the destination computer and to detach the remaining programs not selected for installation.

U.S. Patent Application Publication 2005/0055688 to Gaston M. Barajas et al. (hereinafter, "Barajas et al."), titled "INTEGRATED RAPID INSTALL SYSTEM FOR GENERIC SOFTWARE IMAGES" published Mar. 10, 2005, and is incorporated herein by reference. Barajas et al. describe a method for automatically installing a software image onto an information handling system. The method includes reading an order for an information handling system, reading an image manifest, installing an image specified by the image manifest onto the information handling system as installed software, and automatically configuring the installed software.

U.S. Patent Application Publication 2005/0125524 to Babu K. Chandrasekhar et al. (hereinafter, "Chandrasekhar et al."), titled "CACHE SYSTEM IN FACTORY SERVER FOR SOFTWARE DISSEMINATION" published Jun. 9, 2005, and is incorporated herein by reference. Chandrasekhar et al. describe a method and apparatus for minimizing the size of the cache that is required to store software packages for installation on an information handling system. An analysis is conducted on the individual program files contained in a software application file. In the analysis, the software application file is disassembled into the individual program files and each of the program files is decompressed and stored in temporary file directories. Files that are common to each of the software packages are identified. After the file comparison, the method and apparatus of the Chandrasekhar et al. invention is used to re-group the files to generate a composite program file library that contains all of the program files needed to regenerate the software application files. This composite program file library is then stored on a cache in a factory server used to manufacture information handling systems in a build to order process.

U.S. Patent Application Publication 2006/0053419 to Janel G. Barfield et al. (hereinafter, "Barfield et al."), titled "METHOD AND SYSTEM FOR MODIFYING INSTALLATION SOFTWARE" published Mar. 9, 2006, and is incorporated herein by reference. Barfield et al. describe a method, system and computer program product for modifying installation software in a data processing system. Installation software is stored on a rewritable data storage medium using a file system that allows portions of software stored on the rewritable data storage medium to be modified without modifying other portions of the software stored on the rewritable data storage medium. At least one portion of the stored installation software is modified to provide modified installation software on the rewritable data storage medium. The Barfield et al. invention enables modifications to installation software to be selectively placed on the same data storage medium that stores the installation software.

There is a need for a rapid and secure means to dematerialize files (and provide optional materialization of the dematerialized files) such that file recovery is very difficult but not necessarily impossible. This protects files (sometimes referred to herein as "digital assets") by making data recovery cost more than the value of the digital assets at risk, such as commercial software programs, music tracks, video, still pictures, and the like. By escalating data recovery efforts from a brief, self-service utility approach to a day-long, expert effort equipped with, for example, a $250,000 suite of tools, piracy is rendered economically infeasible.

SUMMARY OF THE INVENTION

In some embodiments, the present invention provides a method for modifying a first storage medium having a plurality of files including a first file, the method including providing a first modification tool; operatively coupling the first storage medium to the modification tool, wherein the operatively coupling includes bypassing a first operating system used to access the plurality of files; and dematerializing, using the first modification tool, at least the first file to form one or more dematerialized files.

In some embodiments, the present invention provides a modification system for modifying a first storage medium having a plurality of files including a first file, the system including a first modification tool that includes: an attachment module configured to operatively couple the modification tool to the first storage medium such that a first operating system used to access the plurality of files is bypassed; and a dematerialization module configured to dematerialize at least the first file to form one or more dematerialized files.

In some embodiments, the present invention provides bulk direct manipulation of file directories without needing to use the normal OS commands. In some embodiments, the present invention materializes/dematerializes many thousands of files a second. More importantly, in some embodiments, files that are meant to be unreadable cannot be recovered as all the file information needed to recover has been destroyed giving the present invention an inherent security totally lacking in conventional systems.

In some embodiments, the present invention acts directly on the file metadata and not via the conventional operating-system erase routines such that program removal is very fast and highly secure from asset theft.

In some embodiments, the present invention provides a system and method for processing the file metadata as data. In some embodiments, this system and method transforms the availability of files, modulates access to file information, and optimizes "modification" of files (e.g., just enough modification to prevent file recovery).

DETAILED DESCRIPTION OF THE INVENTION

Figure 1A:
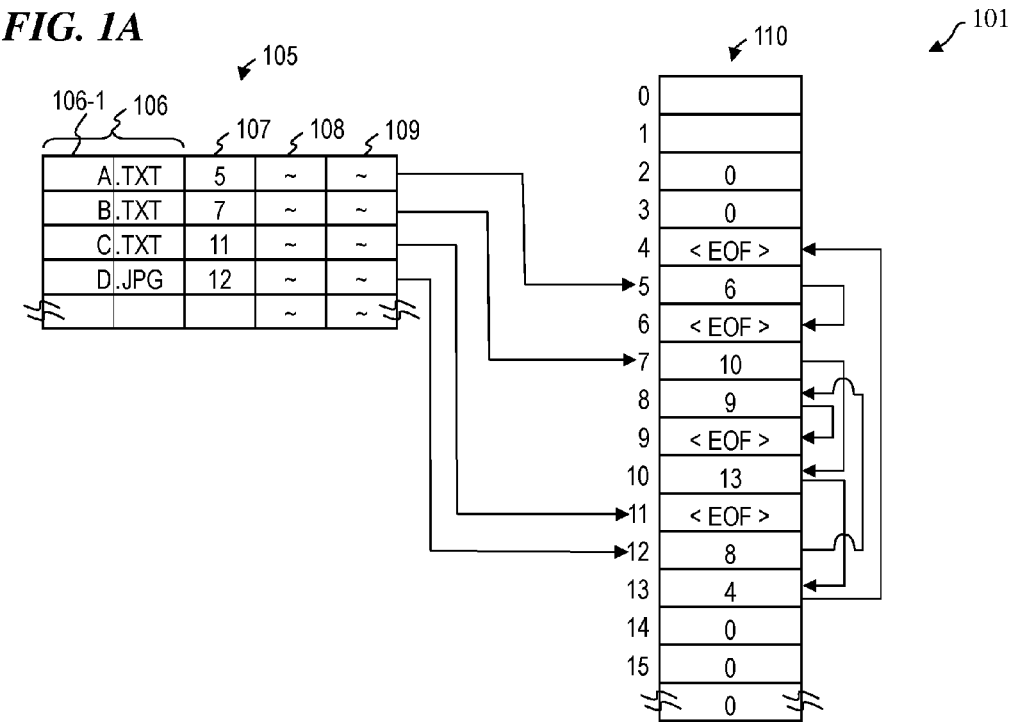
FIG. 1A is a schematic diagram of metadata 101 that describes a plurality of files located on a storage medium.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, the present invention dematerializes files through altering file metadata (with the option of materializing one or more of the dematerialized files at a later time), which is significantly more secure than loosely flagging directory entries and marking data blocks as unused. This approach is also significantly faster than destructive conventional erasing via data overwriting, and approaches the speed of conventional file deletion via simply flagging entries.

As a first approximation, conventional erasure time is linearly proportional to the number of files to be erased. Destructive conventional erasure time is linearly proportional to the size of the files to be erased. In some embodiments of the present invention, dematerialization time is linearly proportional (or, in some embodiments, approximately logarithmically proportional) to the number of files for small numbers of files, but, in other embodiments of the present invention, when a substantially large number of files within a directory are dematerialized (e.g., hundreds of thousands of files), elapsed time will peak and subsequently decline, making dematerialization times shorter and more predictable. In some embodiments, placement of the directory placement is optimized to optimize the speed of dematerialization.

In some embodiments, the present invention materializes/dematerializes approximately 1,000 files per second. In some embodiments, the present invention materializes/dematerializes approximately 5,000 files per second. In some embodiments, the present invention materializes/dematerializes approximately 10,000 files per second. In some embodiments, the present invention materializes/dematerializes approximately 50,000 files per second. In some embodiments, the present invention materializes/dematerializes more than 50,000 files per second.

FIG. 1A is a schematic diagram of metadata 101 that describes a plurality of files located on a storage medium. In some embodiments, metadata 101 includes a directory 105 and a file allocation table 110 (FAT). In some such embodiments, directory 105 is a directory tree that includes a plurality of subdirectories, and allocation table 110 is one of a plurality of allocation tables. In some embodiments, metadata 101 allocates/controls which data blocks are used for the plurality of files and how to traverse from block to block. In some embodiments, each directory entry (i.e., row) of directory 105 includes a filename 106 (having a first character or byte 106-1), a starting FAT cluster 107, a creation date 108, and other metadata 109.

In some embodiments, the present invention modifies metadata 101 to dematerialize and/or materialize one or more of the plurality of files. In some embodiments, the present invention constructs a new directory describing only the desired files and then dematerializes the original (existing) directory to quickly build the modified storage medium (see, e.g., FIG. 5). In other embodiments, the present invention alters the existing directory of the original storage medium in place to quickly build a modified storage medium that contains just the desired files. In some embodiments, altering the existing directory in place is a simpler, and often more suitable and efficient, implementation (as compared to creating a new directory, which is discussed above) because it avoids the complexity of allocating and creating a new directory file, as well as the extra input/output operations needed to copy the information from the old (existing) directory to the new directory. In some embodiments, the metadata modification (whether via altering the directory in place or creating a new directory) of the present invention is done in fractions of a second, which is much faster than writing the contents of the files to disk.

In some embodiments, in order to apply the metadata modifications of the present invention to a tree of directories, the metadata modifications are applied recursively. For example, in some embodiments, to perform dematerialization on a tree of directories, the child directories (i.e., subdirectories) are processed first and then the parent directory is processed. In some embodiments, to perform materialization on a tree of directories, the parent directory is processed first and then the child directories are processed. In some embodiments, when a directory has been emptied of all entries (excluding pointers to itself and its parent), it is rendered inaccessible.

In some embodiments of the present invention's metadata modification, the data itself is still on the storage media, but considerable effort is required to recover it (e.g., in some embodiments, the metadata is encrypted using one or more encryption keys). For example, an analogy of the present invention's metadata modification is that the data falls apart like an unknotted string of pearls whose thread is cut. The pearls are visible, but it is abundantly complex to reassemble them in their exact prior sequence.

Figure 1B:
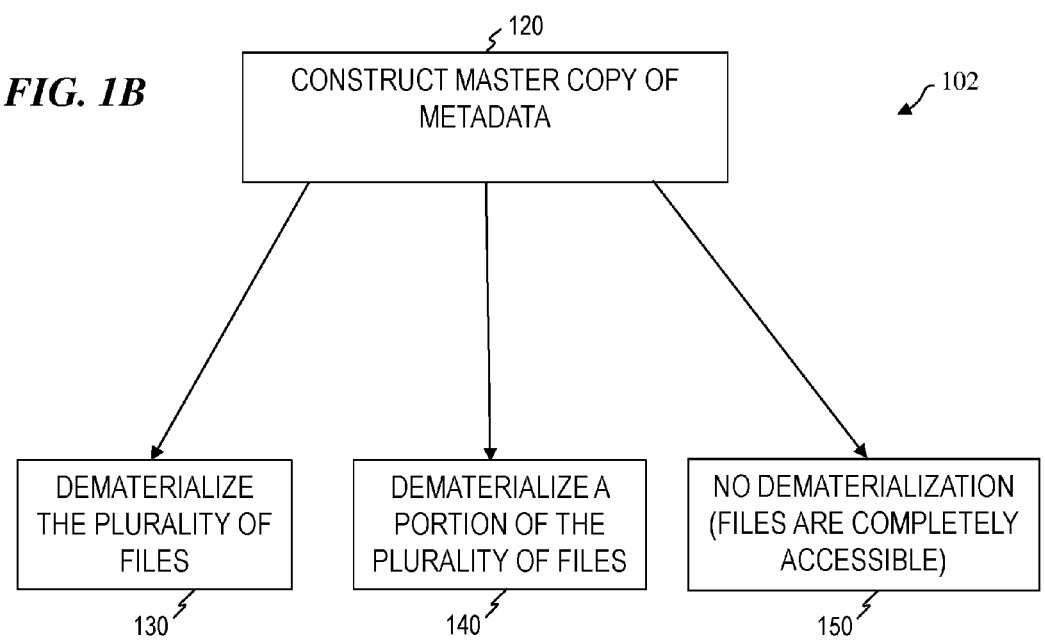
FIG. 1B is a flowchart showing a method 102 for modifying the metadata 101 of FIG. 1A.

FIG. 1B is a flowchart showing a method 102 for modifying the metadata 101 of FIG. 1A. In some embodiments, in order to achieve the desired metadata modification (whether via altering the directory in place or creating a new directory), a master copy 120 (e.g., a list) of metadata 101 is constructed. In some embodiments, the list is then used in one or more of a plurality of ways to alter the metadata present on the storage medium. For example, in some embodiments, the list is used to restore any or all of the directory entries and spatial relationships that may have been dematerialized. The algorithms for the specific file systems described in FIGS. 5, 6, and 7A-7C assume that the system has already been assembled or been given a list of files to keep in a modified storage medium. In some embodiments, the list is kept in any suitable form such as a table, database, or the like. In some embodiments, the list is kept on a modification computer used to dematerialize the storage medium, wherein the modification computer is distinct from a target end-user computer that is configured to utilize the plurality of files.

In some embodiments, after the master copy or list is created at block 120, there are three primary options. In some embodiments, as the first option at block 130, the present invention dematerializes the plurality of files by modifying the metadata for the plurality of files, which yields a storage medium with the actual file data present, but without directory entries or ties to particular data blocks identified. In some such embodiments, selected files of the plurality of dematerialized files are later materialized based on the master copy constructed at block 102 (see, e.g., FIG. 10). For example, in some embodiments, after the plurality of files have been dematerialized, the storage medium containing the plurality of dematerialized files is duplicated to create a plurality of storage media, each storage medium of the plurality of storage media containing the plurality of dematerialized files. In some embodiments, an end user obtains (e.g., purchases) a storage medium from the plurality of storage media, selects which files they would like to keep (e.g., purchase), and the selected files are then materialized according to the embodiments of the present invention. In some embodiments, as the second option at block 140, a portion of the plurality of files is dematerialized, while others of the plurality of files are left alone (e.g., in some such embodiments, the metadata describing the plurality of files is not modified as a whole, but instead individual metadata entries are selectively modified). In some embodiments, as the third option at block 150, none of the metadata of the plurality of files is modified such that the plurality of files on the storage medium are left accessible (in some such embodiments, files are selectively dematerialized at a later time).

Figure 1C:
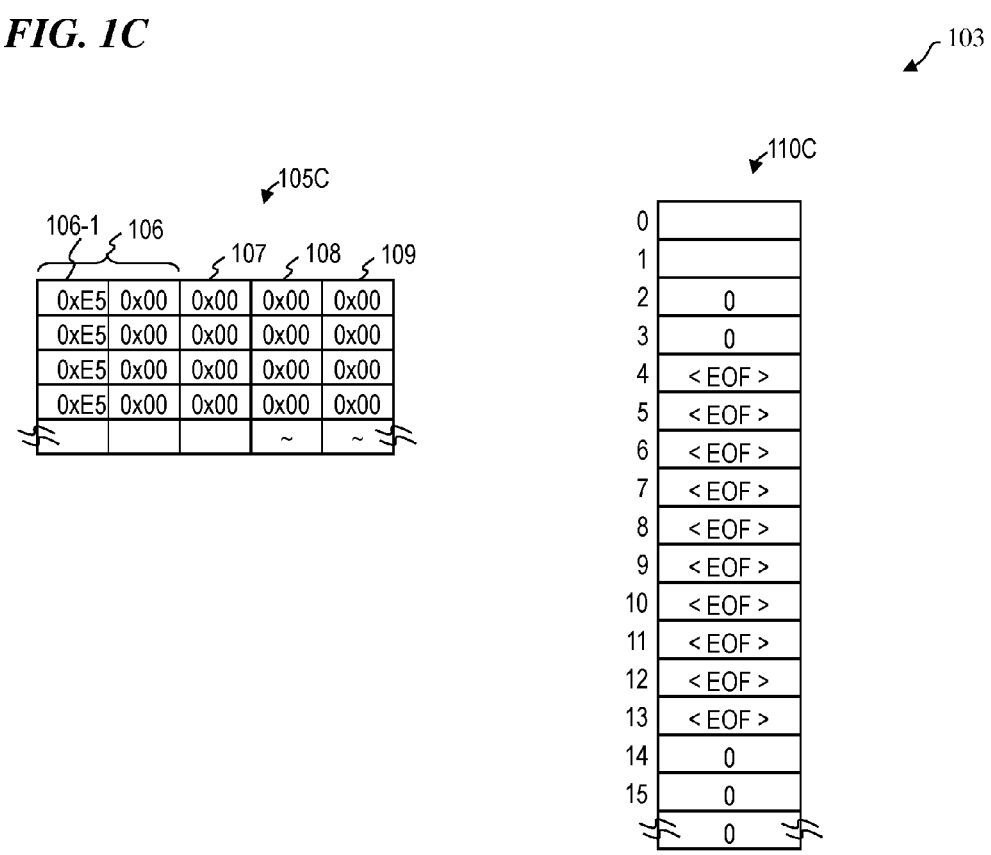
FIG. 1C is a schematic diagram of metadata 103, which represents metadata 101 of FIG. 1B after the plurality of files have been dematerialized at block 130 of FIG. 1B.

FIG. 1C is a schematic diagram of metadata 103, which represents metadata 101 of FIG. 1B after the plurality of files have been dematerialized at block 130 of FIG. 1B. In some embodiments, dematerialization of the plurality of files results in a modified directory 105C and a modified FAT 110C. For example, as illustrated in FIG. 1C, in some embodiments, the first byte 106-1 of each directory entry is set to 0xE5, the remaining bytes of each directory entry are zeroed, and each FAT cluster pointer in FAT 110B is marked as end of file ("<EOF>"). In some embodiments, after dematerialization of the plurality of files, one or more of the plurality of files are later materialized. For example, in some embodiments, after dematerialization of the plurality of files, the storage medium containing the plurality of files is duplicated to create a plurality of storage media, each storage medium of the plurality of storage media containing the plurality of dematerialized files, and then the plurality of storage media are distributed to end-users that select (in some embodiments, via purchase, while in other embodiments, without requiring a purchase) one or more of the dematerialized files to be materialized. In some such embodiments, the plurality of dematerialized files is selected for materialization. In other such embodiments, individual files are selectively materialized.

Figure 1D:
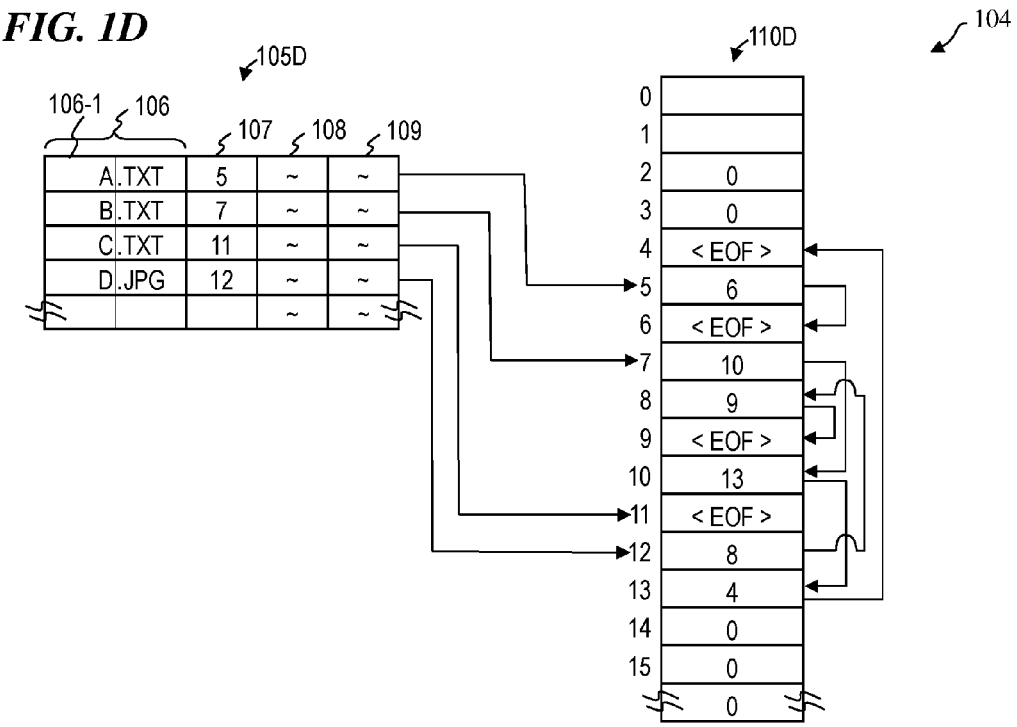
FIG. 1D is a schematic diagram of metadata 104, which represents metadata 103 after the plurality of files has been materialized.

FIG. 1D is a schematic diagram of metadata 104, which represents metadata 103 after the plurality of files have been materialized. In some embodiments, materialization of the plurality of files results in a modified directory 105D and a modified FAT 110D.

Figure 1E:
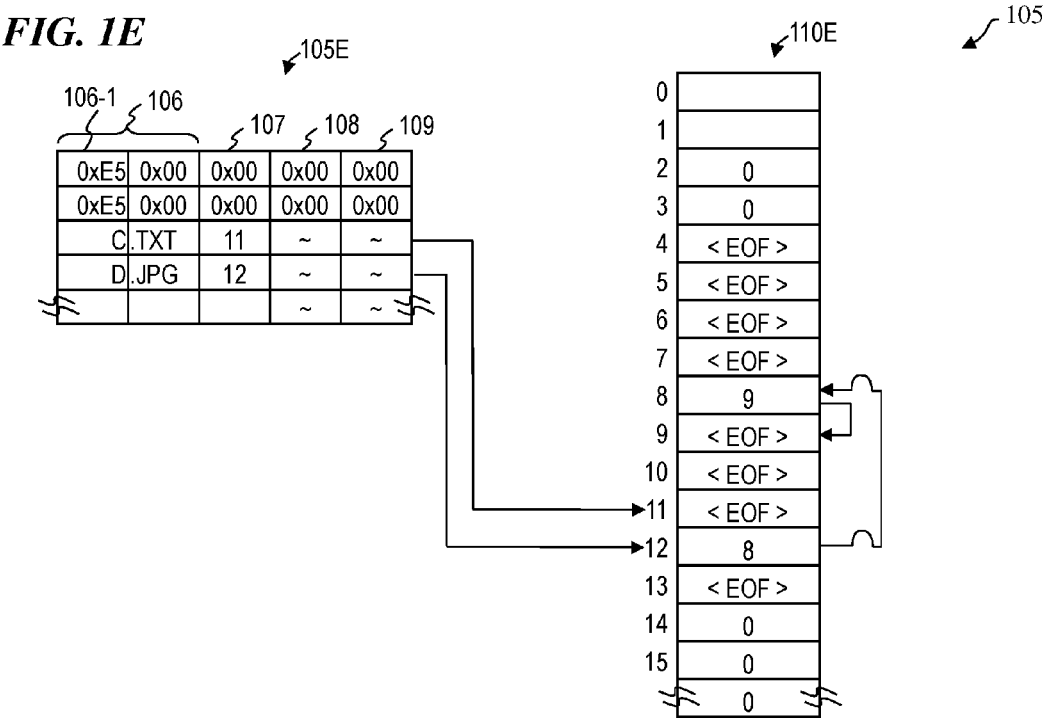
FIG. 1E is a schematic diagram of metadata 105, which represents metadata 103 after two of the plurality of files have been selectively materialized.

FIG. 1E is a schematic diagram of metadata 105, which represents metadata 103 after two of the plurality of files have been selectively materialized. In some embodiments, selective materialization of two of the plurality of files results in a modified directory 105E and a modified FAT 110E.

Dematerializing and Irreversibly Dematerializing Single Files

Figure 2A:
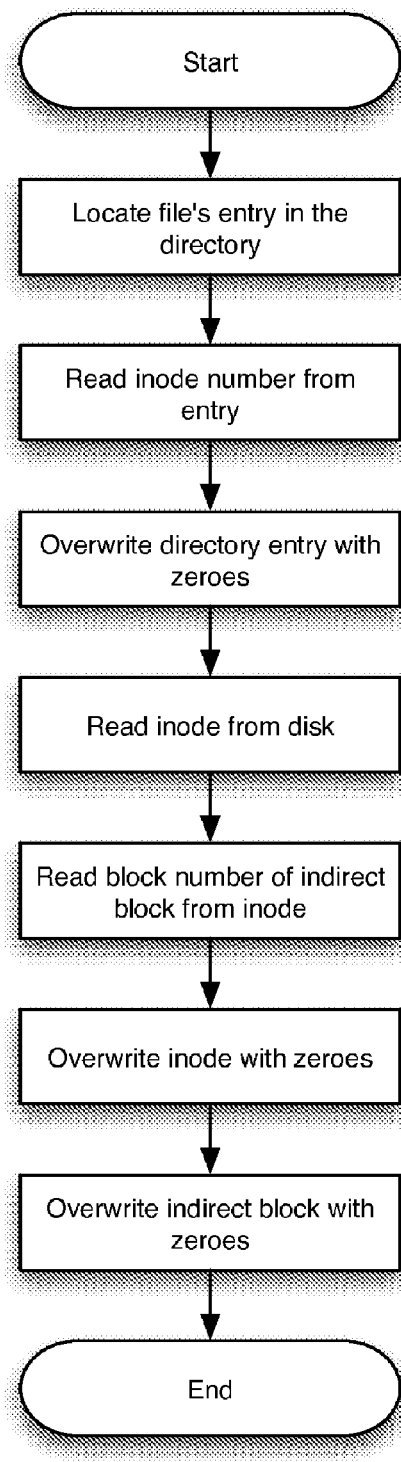
FIG. 2A is a flowchart of a method 201 for dematerializing a single file in an ext2 file system.
Figure 2B:
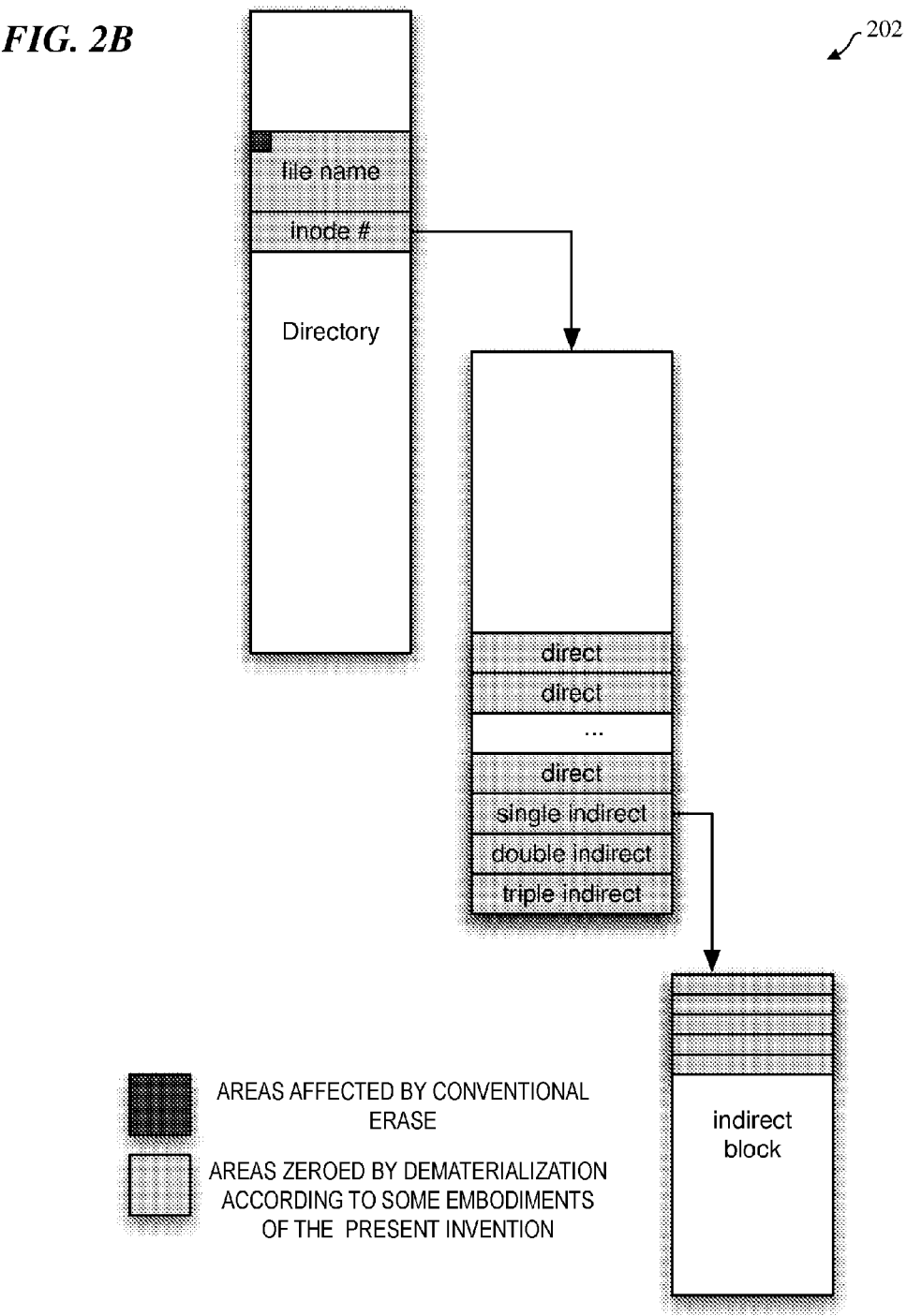
FIG. 2B is a schematic 202 of areas within an ext2 file system affected by dematerialization according to method 201.

FIG. 2A is a flowchart of a method 201 for dematerializing a single file in an ext2 file system. FIG. 2B is a schematic 202 of areas within an ext2 file system affected by dematerialization according to method 201. In some embodiments, individual files are dematerialized by overwriting the entire directory entry with zeroes, rather than just setting a flag or byte in the directory entry. For the ext2 file system, in some embodiments, this approach destroys the file name and index node (inode) number of the file. In some embodiments, for more complete security, the inode for the file is also overwritten with zeroes, hiding the file size, and the locations of the first 12 blocks in the file along with the location of extra block lists used to locate file blocks for files larger than 48 kilobytes. In ext2, in some embodiments, this approach requires a single additional disk access to overwrite the inode with zeroes; the time needed to write the zeroes to the copy of the block in memory before writing it back to the media is negligible. In some embodiments, additional security is obtained by overwriting the first block list of the dematerialized file (the "single indirect block") with zeroes, hiding the identities of the blocks that make up the first 4 megabytes of the file. In some embodiments, instead of dematerializing a file in an ext2 file system, the file is irreversibly dematerialized such that the integrity of the file's data blocks is not guaranteed (i.e., the data blocks associated with the file are released for reallocation). In some embodiments (not illustrated in FIG. 2A or FIG. 2B), dematerializing includes repointing the inode number to a dummy but existing file, thus creating a hard link. In some embodiments, essentially all such dematerialized files become hard links to that dummy file. In some embodiments, by repointing the dirent (i.e., the file system independent directory entry) back to a real inode number, the dematerialized file is materialized. In some such embodiments, this technique is applied to any type of file system.

Figure 3A:
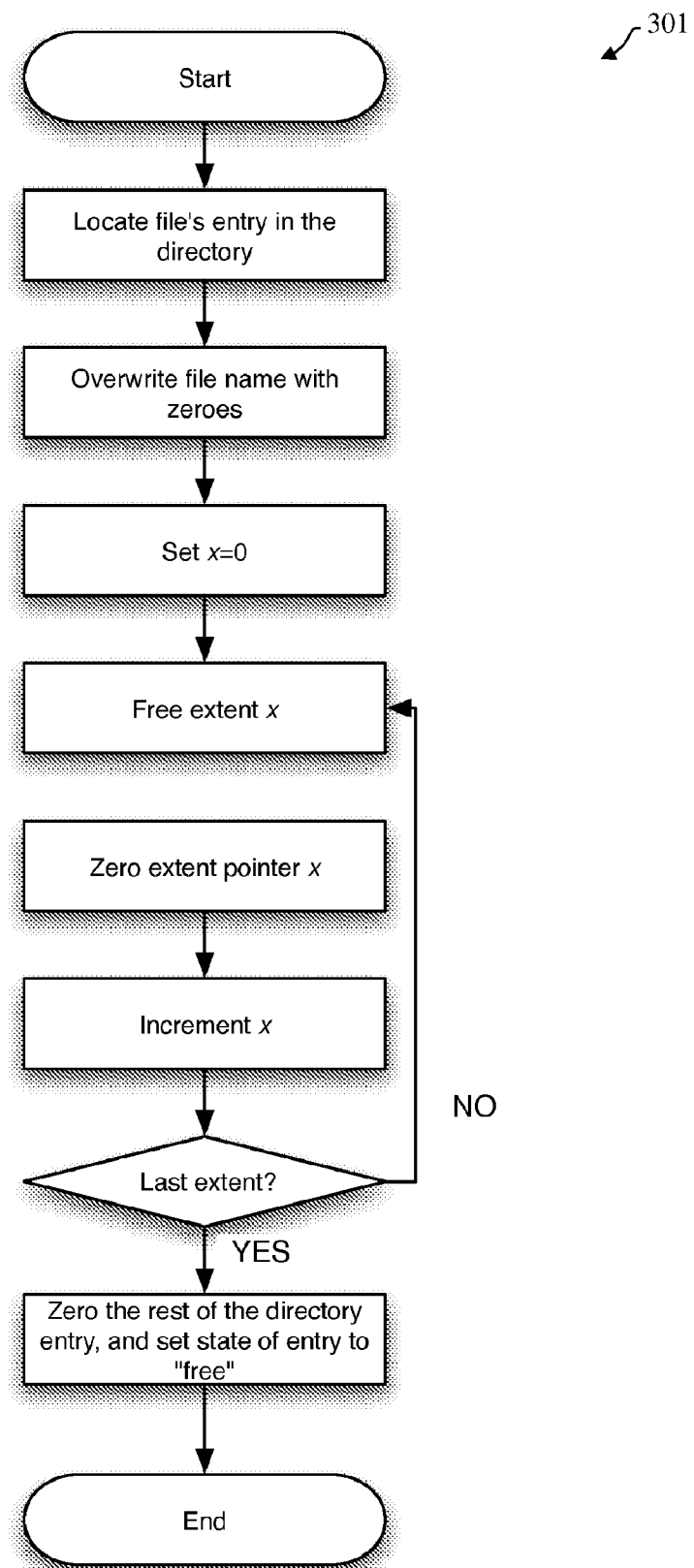
FIG. 3A is a flowchart of a method 301 for dematerializing a single file in a UDF file system.
Figure 3B:
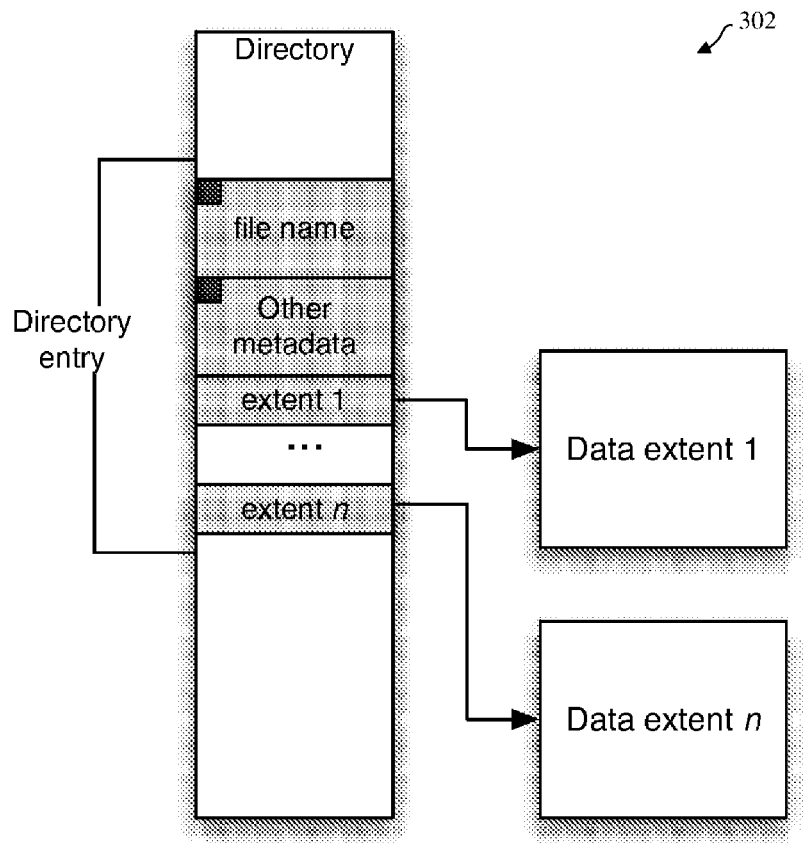
FIG. 3B is a schematic 302 of areas within a UDF file system affected by dematerialization according to method 301.
Figure 3B:
Figure 3B:

FIG. 3A is a flowchart of a method 301 for dematerializing a single file in a UDF file system. FIG. 3B is a schematic 302 of areas within a UDF file system affected by dematerialization according to method 301. In some embodiments, dematerializing a single file in a UDF file system can be done similarly. Directories and file entries in a UDF file system are typically stored in a separate "metadata partition," and each file entry contains the locations of the extents (an extent is a set of 1 or more contiguous blocks). As in ext2, a directory entry contains a file name and a pointer to the file's file entry, which is similar to an inode in ext2. Each file entry can be up to one block long, so, in some embodiments, it is unnecessary to place extent locations anywhere other than the file entry itself. In some embodiments, in a UDF file system, overwriting the entire directory entry with zeroes and then marking the directory entry as unused obscures the existence of the file name and the location of the file entry, and is done as quickly as a conventional deletion that only marks the directory entry as unused. In some embodiments, if greater security is desired, the file entry is overwritten with zeroes, effectively hiding the location of the contents of the file to which the entry pointed. In some embodiments, all of these activities are done in addition to the normal actions taken when conventionally deleting a file in a UDF file system, including the addition of the location of the freed blocks to the free block list. In some embodiments, instead of dematerializing a file in a UDF file system, the file is irreversibly dematerialized such that the integrity of the file's data blocks is not guaranteed (i.e., the data blocks associated with the file are released for reallocation).

Figure 4A:
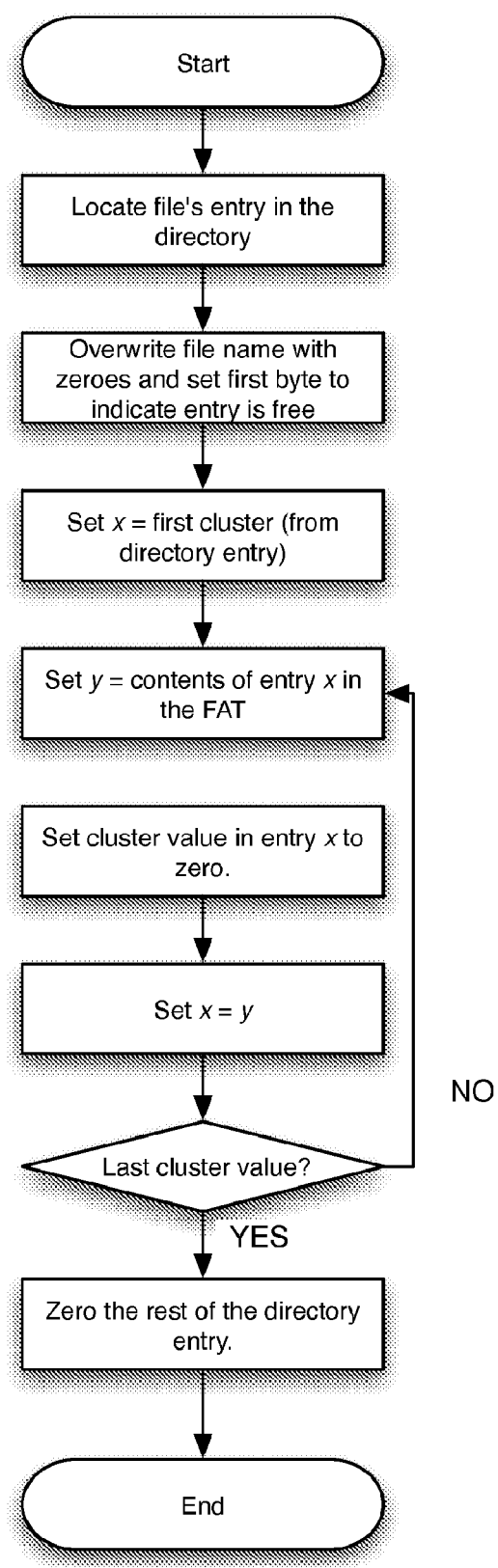
FIG. 4A is a flowchart of a method 401 for irreversibly dematerializing a single file in a FAT32 file system.

FIG. 4A is a flowchart of a method 401 for irreversibly dematerializing a single file in a FAT32 file system. In some embodiments, the directory entry for a file in FAT32 contains the file name (with a possible extension to successive directory entries for long file names) along with attributes including the number of the first cluster (block) of the file's data. In a conventional erase of a file, the first letter of the file name is set to a certain value (e.g., 0xE5), which is used to indicate that the directory entry is available for use. Recovering the file's name and location after a conventional erase is trivial. In contrast, in some embodiments, the present invention irreversibly dematerializes the file by setting the first byte of the directory entry to 0xE5, zeroing all of the remaining bytes of the directory entry, and marking the entry as available (this directory modification completely obliterates both the file name, file size, and the location of its first cluster), and by traversing the allocated cluster chain and zeroing the traversed chain to free the blocks of the file (this FAT modification makes it more difficult to recover a file by simply scanning the FAT). In some embodiments, the irreversible dematerialization of FIG. 4A is particularly strong when many files are irreversibly dematerialized from a large storage volume containing many discrete files. In some embodiments, the metadata processing of FIG. 4A applies to both long and short name entries and to all of the FAT tables.

Figure 4B:
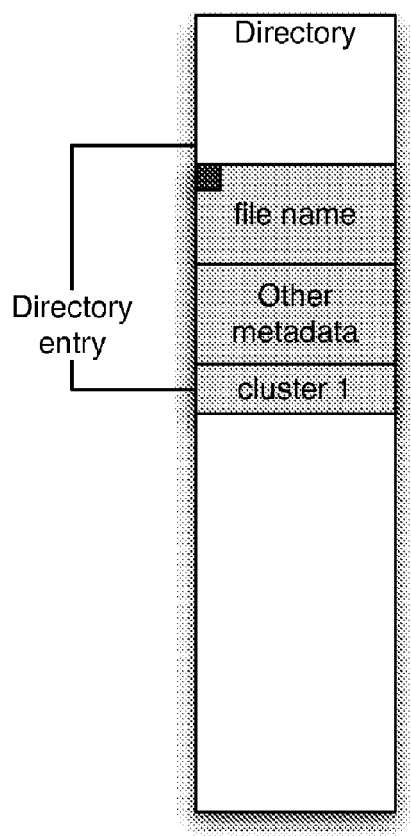
FIG. 4B is a schematic 402 of areas within a directory structure of a FAT32 file system that are affected by dematerialization.
Figure 4B:
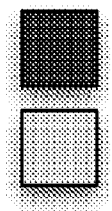

FIG. 4B is a schematic 402 of areas within a directory structure of a FAT32 file system that affected by dematerialization. In some embodiments, dematerialization of a file in a FAT32 file system includes setting the first byte of the directory entry to 0xE5, zeroing all of the remaining bytes of the directory entry, and marking the entry as available.

Figure 4C:
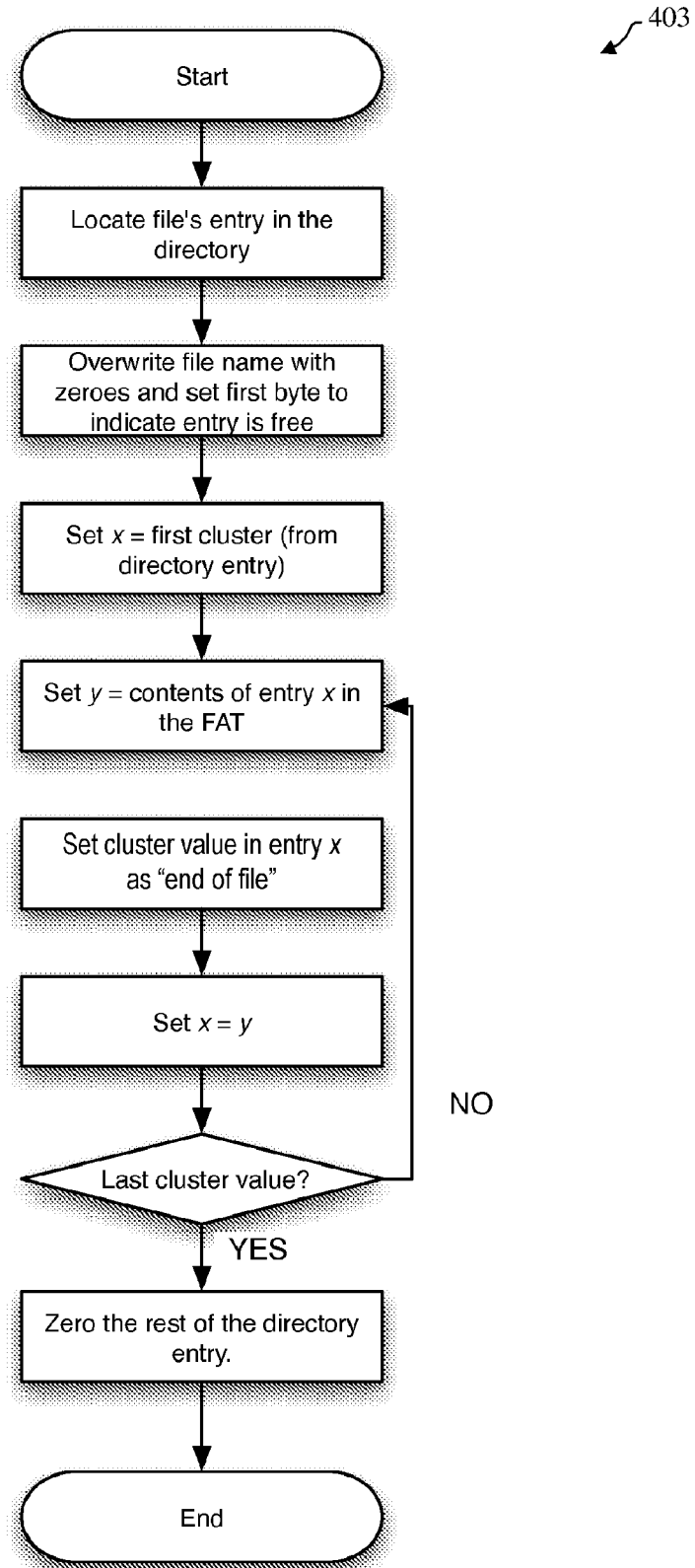
FIG. 4C is a flowchart of a method 403 for dematerializing a single file in a FAT32 file system.

FIG. 4C is a flowchart of a method 403 for dematerializing a single file in a FAT32 file system. In file systems, marking the space occupied by a file as "free" is not without hazard. In some embodiments of the present invention, for example, a file whose directory is modified according to the present invention is later desired to be reconstructed. In some embodiments, a file-space-allocation operation that is performed after the file's directory is modified could allocate any space marked as "free", including the "free" space of the modified file, and thus potentially eliminate the possibility for reconstructing the file. In some embodiments, to avoid this hazard, the space belonging to the file is instead marked as occupied, but not in a fashion that permits its association with the removed file to be easily reconstructed. For example, in some embodiments, under FAT, each space belonging to the file (i.e., the file's data area) is marked as an "End-of-File Cluster", thus breaking the connections between the blocks but preventing the space from being recycled. In some embodiments, if a volume or file system check were performed after the end-of-file marking is performed, the volume check would identify large numbers of one-cluster files, and thus, it would remain difficult to reconstruct the FAT chains for each file (e.g., in some embodiments, if a file has 10,000 FAT clusters associated with it, the end-of-file marking of that file results in 10,000 separate 1-cluster files).

Dematerializing and Irreversibly Dematerializing Large Numbers of Files

Altering individual directory entries works well for dematerialization of individual files, but can also be optimized for dematerializing large numbers of files as might be done, in some embodiments, for distribution of a relative few number of files contained on a relatively large storage medium (i.e., for modifying an original storage medium that contains a large number of files to produce a modified storage medium that contains only a small percentage of the files contained on the original storage medium). In some such embodiments, the original directory structure for the original storage medium describes hundreds of thousands of files, but the distributed (i.e., modified) storage medium retains a relatively small percentage of the files (e.g., in some embodiments, ten thousand or less).

In some embodiments, the original storage medium contains approximately 50,000 files. In some embodiments, the storage medium contains between approximately 50,000 files and approximately 100,000 files. In some embodiments, the storage medium contains between approximately 100,000 files and approximately 500,000 files. In some embodiments, the storage medium contains between approximately 500,000 files and approximately 1,000,000 files. In some embodiments, the storage medium contains more than 1,000,000 files. In some embodiments, the storage medium contains any other suitable number of files.

Figure 5:
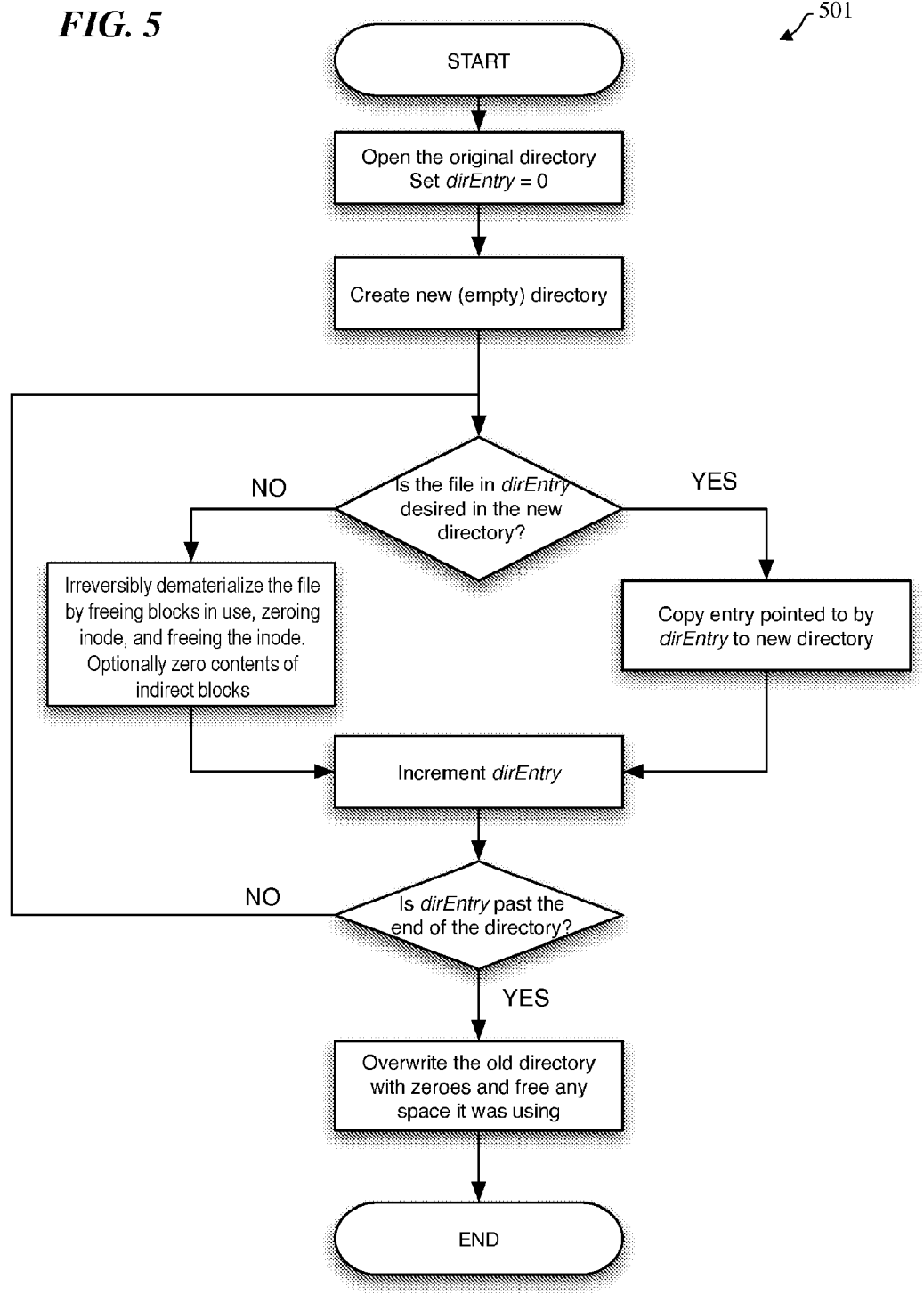
FIG. 5 is a flowchart of a method 501 for irreversibly dematerializing multiple files in an ext2 file system.

FIG. 5 is a flowchart of a method 501 for irreversibly dematerializing multiple files in an ext2 file system. In some embodiments, for an ext2 file system, a new (empty) directory is created, and the original directory is opened. Next, the process goes through each directory entry in the original directory in turn. If the file referenced by the directory entry is desired to be kept, the directory entry is copied from the old directory to the new directory. If the file referenced by the directory entry is not desired, the file is irreversibly dematerialized. In some embodiments (e.g., if the file system does not need to accommodate additional files), the location of the non-desired file(s) is hidden from future users (i.e., the non-desired file(s) are dematerialized, which is not illustrated by FIG. 5). In some embodiments, after all of the entries in the old directory have been scanned, the old directory is modified either by overwriting all of the directory entries one or more times with zeroes (or other patterns) or overwriting a portion of the all of the directory entries with zeroes (or other patterns). In some embodiments, rather than creating a new directory, the irreversible dematerializing of multiple files in an ext2 file system is performed by altering the existing directory in place (e.g., by selectively irreversibly dematerializing the non-desired files).

Figure 6:
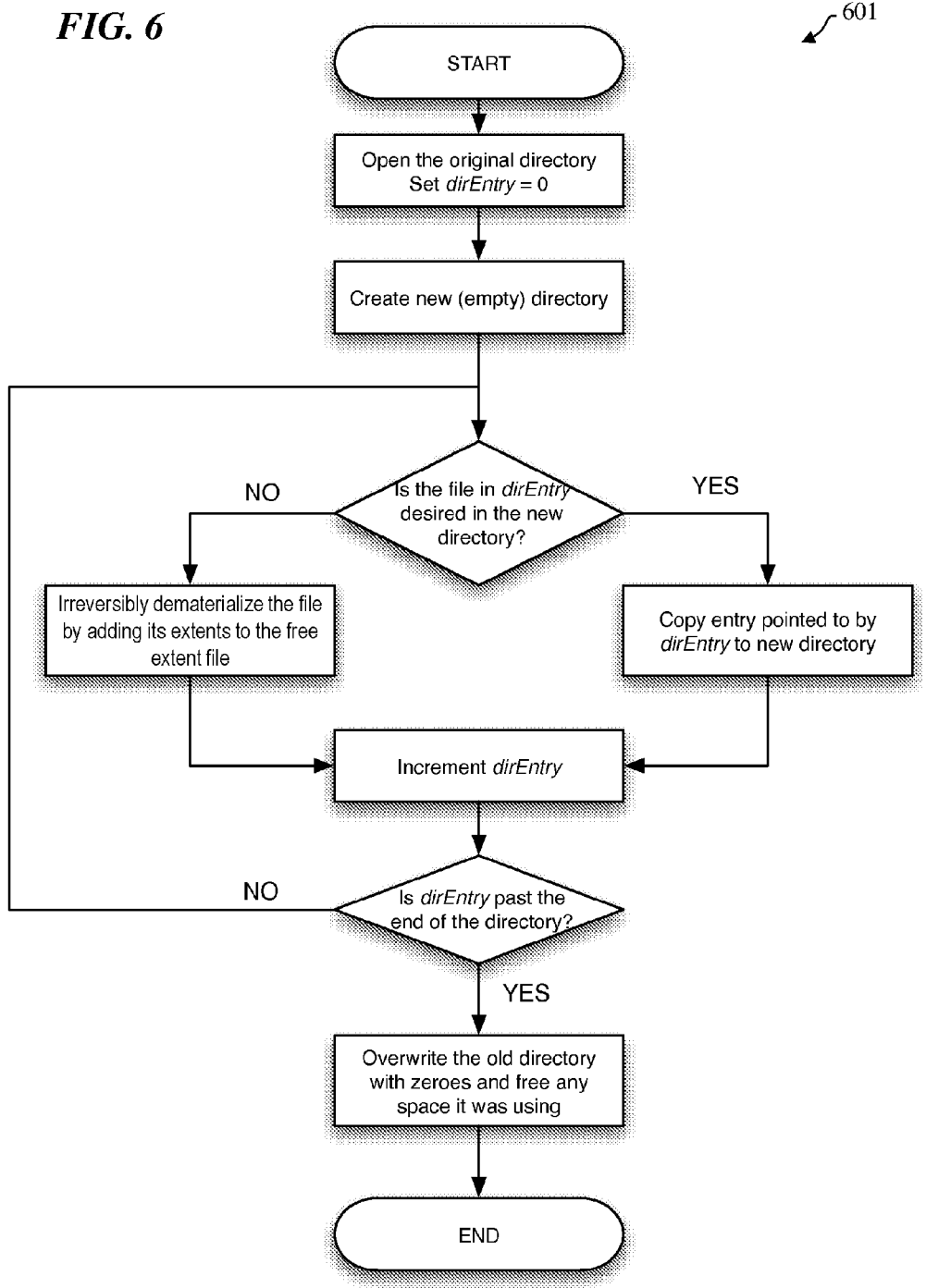
FIG. 6 is a flowchart of a method 601 for irreversibly dematerializing multiple files in a UDF file system directory.

FIG. 6 is a flowchart of a method 601 for irreversibly dematerializing multiple files in a UDF file system directory. In some embodiments, the procedure for irreversibly dematerializing multiple files in a UDF file system is similar to the procedure for irreversibly dematerializing multiple files in an ext2 file system. In some embodiments, as shown above, a new (empty) directory is created, and the original (old) directory is opened. In some embodiments, each directory entry of the original directory is examined in turn, the entry is copied into the new directory if it is to be kept, and the non-desired file(s) are irreversibly dematerialized. In some embodiments, after all directory entries have been examined, the old directory is modified by overwriting all or a portion of the directory entries one or more times with zeroes. In some embodiments, rather than creating a new directory, the irreversible dematerializing of multiple files in an UDF file system is performed by altering the existing directory in place (e.g., by selectively irreversibly dematerializing the non-desired files).

Figure 7A:
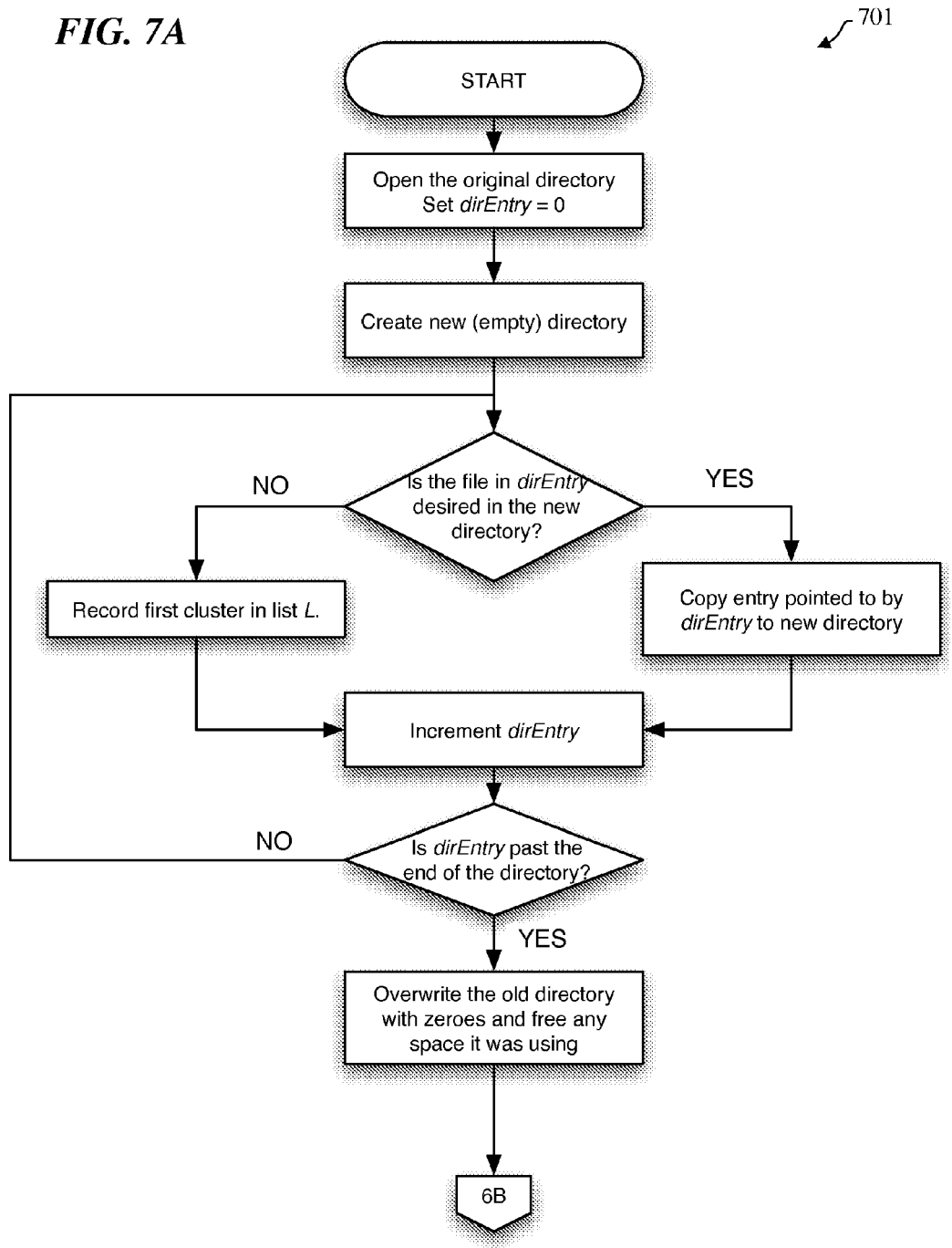
FIG. 7A is a flowchart of a method 701 for modifying directory entries of multiple files in a FAT32 file system directory.

FIG. 7A is a flowchart of a method 701 for modifying directory entries of multiple files in a FAT32 file system directory. In some embodiments, method 701 is a portion of an irreversible dematerialization of the multiple files that also includes method 702 of FIG. 7B. In other embodiments, method 701 is portion of a dematerialization of the multiple files that includes method 703 of FIG. 7C. In some embodiments, method 701 proceeds by creating a new (empty) directory and opening the original directory. In some embodiments, each directory entry of the original directory is examined in turn, the entry is copied into the new directory if it is to be kept, and the directory entries for non-desired file(s) are modified (e.g., zeroed). In some embodiments, after all directory entries have been examined, the old directory is modified by overwriting all or a portion of the directory entries one or more times with zeroes. In some embodiments, directory modification includes recording the first cluster used in the dematerialized file in a list (see, e.g., FIG. 1B).

Figure 7B:
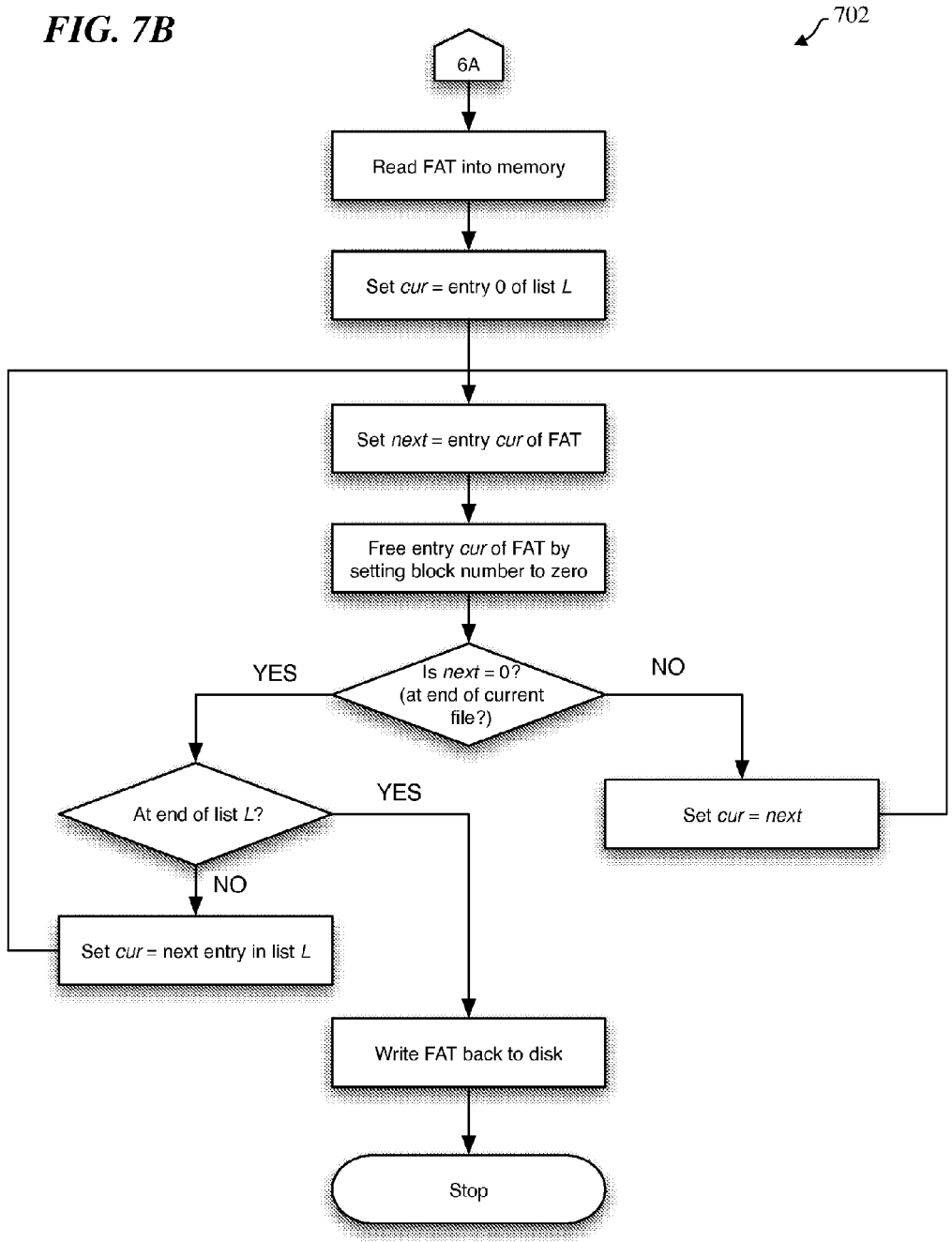
FIG. 7B is a flowchart of a method 702 for freeing blocks in a FAT32 file system as part of a batch irreversible dematerialization.

FIG. 7B is a flowchart of a method 702 for freeing blocks in a FAT32 file system as part of a batch irreversible dematerialization. In some embodiments, after all entries in the original directory have been examined (and, in some embodiments, copied to a new directory, or, in other embodiments, the original directory is updated in place), the process reads in the FAT and continues irreversible dematerialization of the files by starting at each file's first cluster and following the pointers through the FAT, marking each visited pointer as free by zeroing it to prevent file space reuse. In some embodiments, by grouping all of the modifications to the FAT together, this approach is much faster than irreversibly dematerializing each file separately. Since all copies of the FAT are identical, and the FAT size is within modern memory capacity constraints, in some embodiments, the FAT is updated in memory for all operations, and then all FAT copies are rewritten to disk en masse.

Figure 7C:
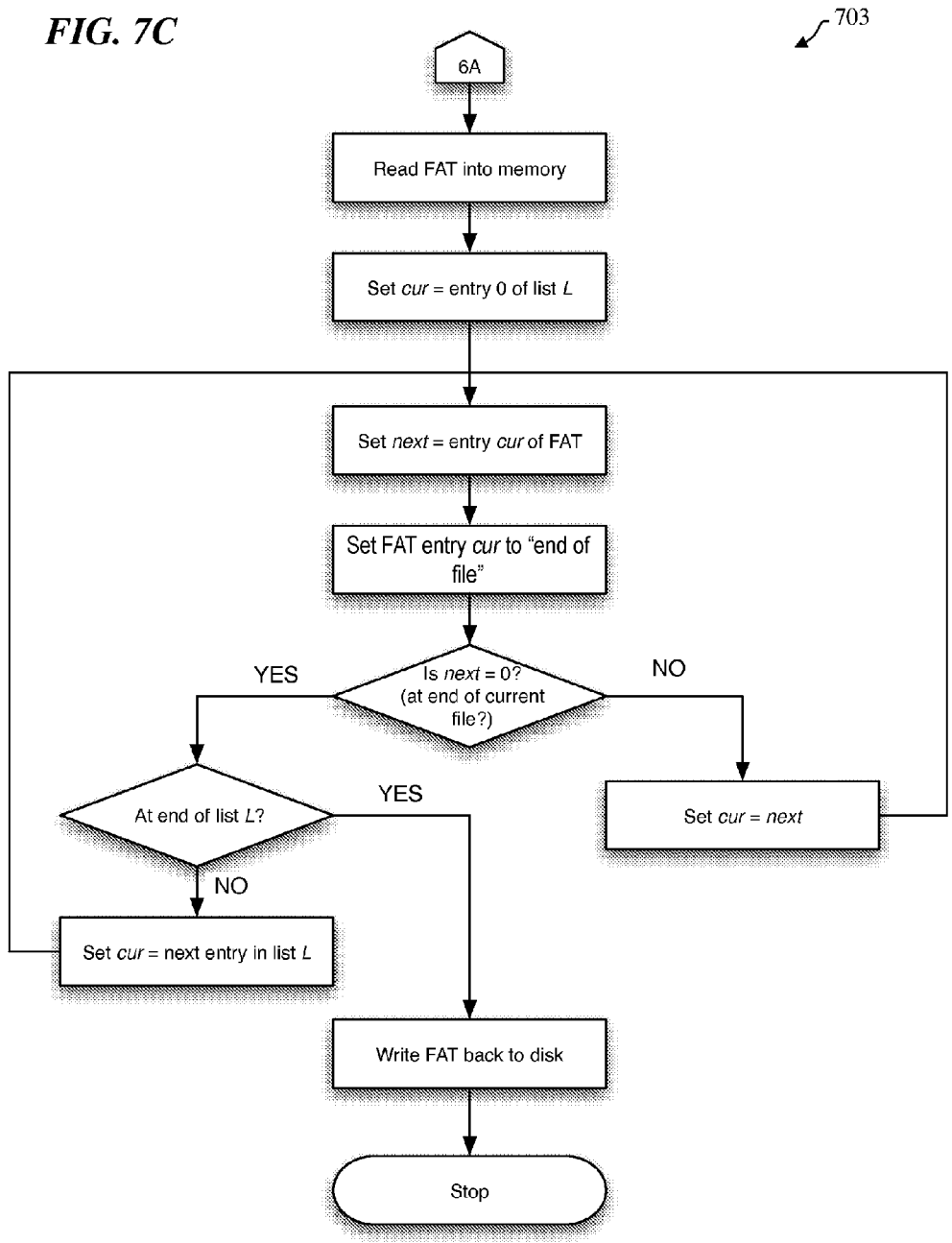
FIG. 7C is a flowchart of a method 703 for marking data blocks associated with files in a FAT32 file system as occupied as part of a batch dematerialization.

FIG. 7C is a flowchart of a method 703 for marking data blocks associated with files in a FAT32 file system as occupied as part of a batch dematerialization. In some embodiments, after all entries in the original directory have been examined (and, in some embodiments, copied to a new directory, or, in other embodiments, the original directory is updated in place), the process reads in the FAT and continues dematerialization of the files by starting at each file's first cluster and following the pointers through the FAT, marking each visited pointer as an "end of file" to prevent file space reuse.

Obfuscating File Structure

In some embodiments, it is prudent to take some additional precautions to make recovery of intact files more difficult. For example, many file systems, particularly those that utilize optical media, store the contents of a file in contiguous blocks on the media. In such a case, recovery simply consists of finding the first block of a file; the remaining blocks follow sequentially. To combat this problem, in some embodiments, the blocks of a file are written non-contiguously. In some embodiments, to ensure that performance is still acceptable, however, the file is stored as non-contiguous extents of reasonable size, say 128 kilobytes to 4 megabytes, making reassembly of the files without usable metadata much more difficult. It is important to note that data in such a file system is still recoverable, but the cost and effort necessary to recover it should exceed the value of the files deleted in such a way.

In some embodiments, file structure is obfuscated by overwriting selected file blocks to make recovery more difficult. Overwriting just a few blocks in a large file can make the file unusable, especially if the file contains program code. In some embodiments, this is accomplished by overwriting the first block of the file and a small number of subsequent blocks with patterned or random bits. Overwriting the first block obscures the type of the file as well as information about the file's size, entry points, checksum, metadata tags, and other critical information. In some embodiments, overwriting a small number of subsequent blocks renders the entire file useless, particularly if the file contains executable program code. In some embodiments, with relatively little effort, this overwriting technique is used with any of the deletion mechanisms listed above to make file recovery considerably more difficult.

Figure 8:
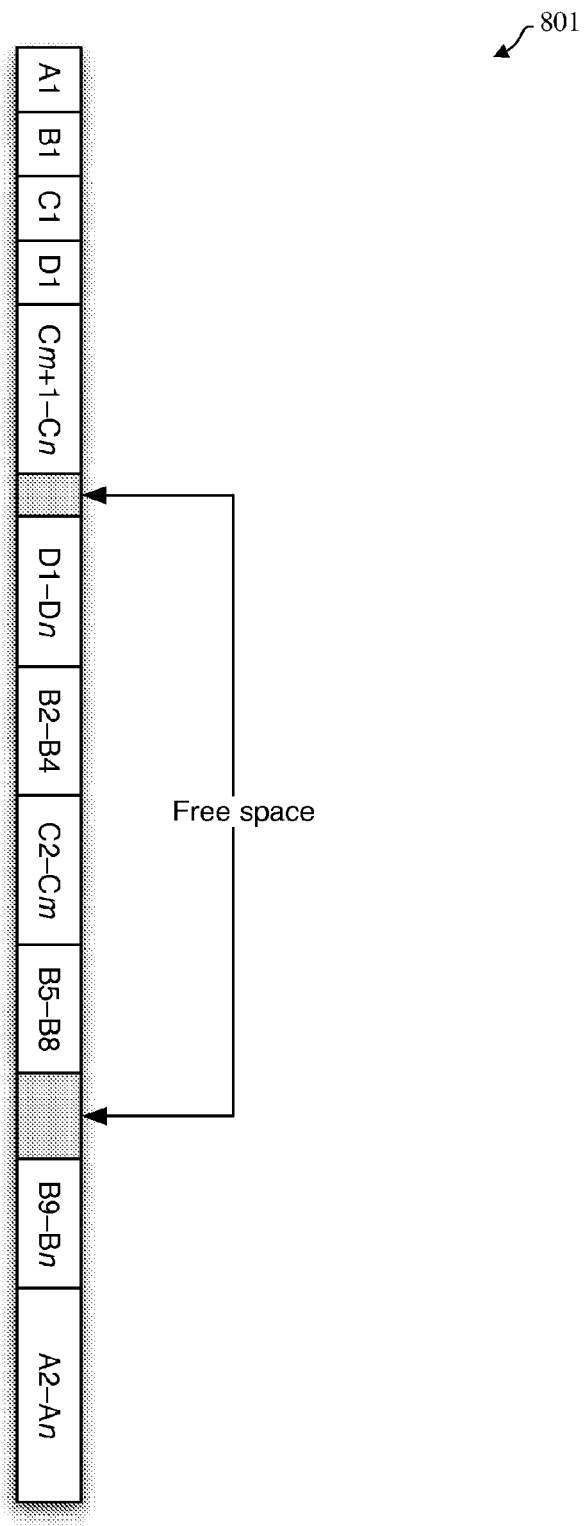
FIG. 8 is a data layout schematic 801 for enhancing batch dematerialization.

FIG. 8 is a data layout schematic 801 for enhancing batch dematerialization. In some embodiments, the two approaches for obfuscation set forth above are combined by storing the first blocks of many files near one another, with the remainder of the files spread across the media. In this way, the first blocks of many files are overwritten by writing patterns or random bits to large sequential chunks of the media. Since sequential writes are often much faster than writes to non-consecutive locations, this approach has the advantage of being able to obfuscate many files relatively quickly. In addition, the non-sequential storage of individual files makes it more difficult to locate them without the metadata that describes the location of the dematerialized files' contents. In some embodiments, optionally after dematerialization, background storage defragmentation is scheduled or immediately performed to improve access of the remaining files. In some embodiments, in Windows implementations, an optional cleanup of the Windows Registry is used to remove linkages or indicia to any of the dematerialized files or programs. In some embodiments, in addition to or in replacement of the obfuscation techniques described above, files and/or their metadata are obfuscated by encryption (e.g., in some embodiments, files are encrypted using an on-the-fly encryption software such as provided by True-Crypt, www.truecrypt.org).

Bypassing the Operating System

Among the critical functions of operating systems is the maintenance of data integrity and file structures. An OS has multiple levels of protection to prevent non-OS modification of disk allocation and file metadata, including duplicate directories and journaling. In some embodiments, it is not enough to know how to modify the metadata, it is necessary to be able to modify it without the OS blocking or backing out those changes. So, in some embodiments, in order to make these changes, the OS is bypassed. To illustrate, in a PC environment, this can be accomplished in multiple ways. In some embodiments, the boot sequence is modified by the BIOS or other form of firmware. When a PC is manufactured, on power-on self-test (POST), the BIOS downloads a bootstrap program from the network, which then downloads the OS and test routines. Similarly, the BIOS either contains or downloads routines to modify file metadata, prior to the installation or operation of the fully functional OS. In some embodiments, if the OS is installed and functional, the routines of the present invention are queued to execute ahead of the normal complete OS initialization. This technique is commonly used by defragmentation programs that modify or defragment file metadata. In some embodiments, the OS file system is rewritten, added to, or extended with new routines to modify metadata. While possible, this is by far the most difficult and expensive of approaches.

Figure 9A:
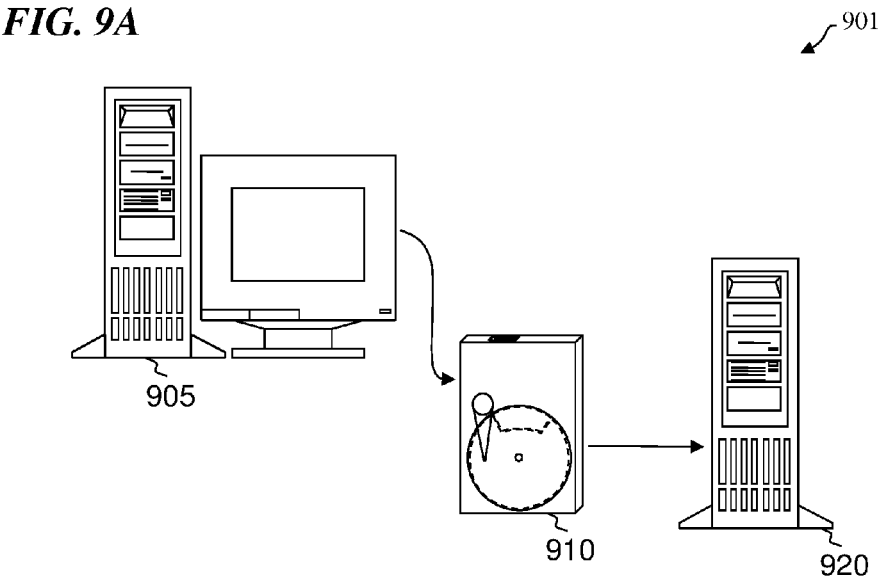
FIG. 9A is a schematic diagram of a metadata modification system 901.

FIG. 9A is a schematic diagram of a metadata modification system 901. In some embodiments, modification system 901 includes a modification tool 905 that is used to modify the metadata of files stored on a storage medium 910 (an optical disk or disk drive (ODD), magnetic disk drive, solid-state memory (e.g., Flash or holographic memory), or the like). In some embodiments, modification tool 905 is a computer that is distinct from the target device 920 (e.g., a personal computer) that will house or connect to the storage medium 910 when it is manufactured or in actual use. In some embodiments, modification tool 905 uses any OS that, unlike Windows systems, does not automatically mount a drive (or can be configured not to automatically mount a drive) when one is detected (e.g., in some embodiments, the present invention uses the Ubuntu Linux operating system, www.ubuntu.com). For example, in some embodiments, tool 905 is a Linux computer that operatively couples to storage medium 910 without mounting it. This allows storage medium 910 to be opened for reading and writing data without expecting, requiring, or locating a metadata structure. In some embodiments, the Linux computer 905 will not arbitrarily modify data without specifically being instructed. In some embodiments, modification system 901 is inexpensive, scalable, and allows for storage medium customization outside of and parallel to the manufacturing critical path. In contrast to the present invention's separate modification tool, an undisciplined Windows system, for example, may attempt to alter the storage medium 910 when it is mounted.

In some embodiments, storage medium 910 is to be customized (by selecting content to be kept and removing all other non-relevant data) for installation in (or connection to) a corresponding target device 920 for delivery to a particular end-user. In other embodiments, storage medium 910 is already installed into computer 920 before metadata modification is performed. In still other embodiments, computer 920 is used to provide metadata modification for outside devices such as a music player to which the storage medium 910 is connected.

Figure 9B:
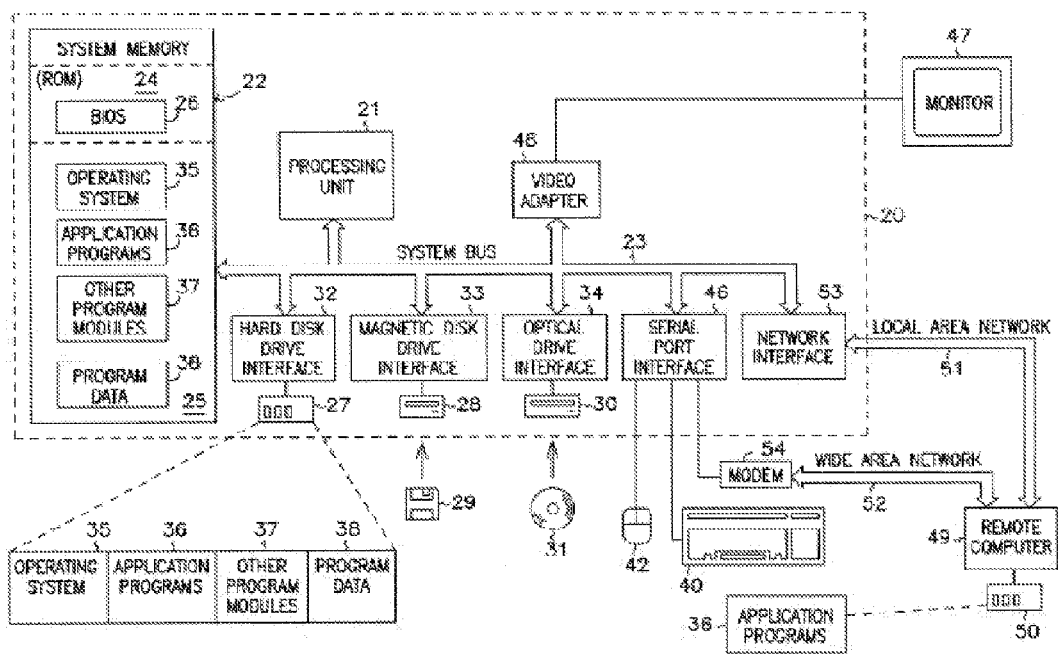
FIG. 9B is an overview diagram of a hardware- and operating-environment (or system) 902.

FIG. 9B is an overview diagram of a hardware- and operating-environment (or system) 902. The description of FIG. 9B is intended to provide a brief, general description of suitable computer hardware and a suitable computing environment in conjunction with which the metadata modification of the present invention may be implemented (e.g., in some embodiments, computer 20 of environment 902 is used as tool 905 of FIG. 9A). In some embodiments, the invention is described in the general context of computer-executable instructions, such as program modules, that are stored on computer-readable media and that are executed by a computer. Generally, program modules include routines, programs, objects, components, data structures, and the like, that perform particular tasks or implement particular abstract data types.

In some embodiments, environment 902 includes a user-control console computer 20 that is programmable. In some embodiments, application programs 36 stored on a computer-readable storage device (e.g., optical disk 31 (CDROM, DVD, Blu-ray Disc™ (BD), or the like), magnetic or Flash storage device 29 (e.g., floppy disk, thumb drive, SDHC~ (Secure-Data High-Capacity) memory card or the like), and/or a storage device 50 connected to a remote computer 49 that connects to computer 20 across a local-area network 51 or a wide-area network 52 such as the internet) contain instructions and/or control structures (such as look-up tables, control parameters, databases and the like) that are processed to control the metadata modification methods of the present invention described herein. In some embodiments, the applications programs 36 are partially executed in the computer 20, and then partially executed in storage medium 910 of FIG. 9A.

As shown in FIG. 9B, in some embodiments, the hardware- and operating-environment 902 includes user-control console computer 20, or a server 20, including a processing unit 21, a system memory 22, and a system bus 23 that operatively couples various system components including the system memory 22 to the processing unit 21. In some embodiments, there may be only one, or in other embodiments, there may be more than one processing unit 21, such that the processor of computer 20 comprises a single central-processing unit (CPU), or a plurality of processing units, commonly referred to as a multi-processor or parallel-processing environment. In various embodiments, computer 20 may be implemented using a conventional computer, a distributed computer, or any other type of computer including those embedded in cell phones, personal-data-assistant devices or other form factors. For example, in some embodiments, computer 20 is implemented as any suitable computing device such as a desktop computer or a network of such computers, a laptop computer (e.g., a Macbook®), a tablet computer (e.g., an iPad®), a music and/or video-player computer (e.g., an iPod Touch®), a cell phone computer (e.g., an iPhone®), a smart television (one that can stream video programming from the internet), a video-streaming device (e.g., a Roku® or an AppleTV®) that obtains content from the internet and outputs the content to a conventional high-definition TV), a computer/MP3-player/CD-player/GPS/phone system in an automobile or other vehicle, or any other suitable personal-computing (PC) platform (although several Apple® products are listed as typical examples here since most persons of skill in the art can identify the type of device by analogy to such Apple® products, the products of any other manufacturer may be substituted).

The system bus 23 can be any of several types of bus structures including a memory bus or memory controller, a peripheral bus, and a local bus using any of a variety of bus architectures. The system memory can also be referred to as simply the memory, and includes read-only memory (ROM) 24 and random-access memory (RAM) 25. A basic input/output system (BIOS) 26, containing the basic routines that help to transfer information between elements within the computer (or server) 20, such as during start-up, may be stored in ROM 24. The computer 20 further includes a hard disk drive 27 for reading from and writing to a magnetic hard disk, a removable-media drive or Flash controller 28 for reading from or writing to a removable magnetic floppy-disk or Flash storage device 29, and an optical disk drive 30 for reading from or writing to a removable optical disk 31 (such as a CDROM, DVD, Blu-ray Disc™ (BD) or other optical media).

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non-volatile, non-ephemeral storage of computer-readable instructions, data structures, program modules and other data for the computer 20. It should be appreciated by those skilled in the art that any type of computer-readable media which can store data that is accessible by a computer, such as magnetic tapes, Flash memory cards, digital video disks, Bernoulli cartridges, random-access memories (RAMs), read-only memories (ROMs), redundant arrays of independent disks (e.g., RAID storage devices), network and cloud-accessible storage, and the like, can be used in the exemplary operating environment.

A plurality of program modules that implement the optimization methods of the present invention can be stored on the hard disk, magnetic or Flash storage device 29, optical disk 31, ROM 24, or RAM 25, including an operating system 35, one or more application programs 36, other program modules 37, and program data 38. A plug-in program containing a security transmission engine for the present invention can be resident on any one, or on a plurality of these computer-readable media.

In some embodiments, a user enters commands into the computer 20 through input devices such as a keyboard 40, pointing device 42 or other suitable devices. These input devices are often connected to the processing unit 21 through a serial port interface 46 that is coupled to the system bus 23, but can be connected by other interfaces, such as a parallel port, game port, eSATA, Ethernet, Thunderbolt port, a universal serial bus (USB), or the like; a monitor 47 or other type of display device can also be connected to the system bus 23 via an interface, such as a video adapter 48. The monitor 47 can display a graphical user interface for the audiologist and/or user. In addition to the monitor 47, computers typically include other peripheral output devices (not shown), such as speakers and printers.

In some embodiments, computer 20 operates in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above relative to the computer 20, although only memory storage device 50 and application programs 36 have been illustrated in FIG. 9B. The logical connections depicted in FIG. 9B include local-area network (LAN) 51 and wide-area network (WAN) 52. Such networking environments are commonplace in office networks, enterprise-wide computer networks, intranets and the Internet, which are all types of networks.

When used in a local-area networking (LAN) environment, the computer 20 is connected to the LAN 51 through a network interface, modem or adapter 53, which is one type of communications device. When used in a wide-area networking (WAN) environment such as the internet, the computer 20 typically includes an adaptor or modem 54 (a type of communications device), or any other type of communications device, e.g., a wireless transceiver, for establishing communications over the wide area network 52, such as the internet. The modem 54, which may be internal or external, is connected to the system bus 23 via the serial port interface 46. In a networked environment, program modules depicted relative to the personal computer 20, or portions thereof, can be stored in the remote memory storage device 50 of remote computer (or server) 49 and accessed over the internet or other communications means. Note that the transitory signals on the internet may move stored program code from a non-transitory storage medium at one location to a computer that executes the code at another location by the signals on one or more networks. The program instructions and data structures obtained from a network or the internet are not "stored" on the network itself, but are stored in non-transitory storage media that may be connected to the internet from time to time for access. It is appreciated that the network connections shown are exemplary, and in some embodiments, other means of, and communications devices for, establishing a communications link between the computers may be used including hybrid fiber-coax connections, T1-T3 lines, DSL's, modem, OC-3 and/or OC-12, TCP/IP, microwave, WAP (wireless application protocol), and all other electronic media through standard switches, routers, outlets and power lines, as the same are known and understood by one of ordinary skill in the art.

The hardware and operating environment in conjunction with which embodiments of the invention may be practiced has been described. The computer 20 in conjunction with which embodiments of the invention can be practiced can be a conventional computer, a distributed computer, or any other type of computer; the invention is not so limited. Such a computer 20 typically includes one or more processing units as its processor, and a computer-readable medium such as a memory. The computer 20 can also include a communications device such as a network adapter or a modem, so that it is able to communicatively couple to other computers, servers, or devices. In some embodiments, one or more parts of environment 802 elicits and receives input from a user, and based on the input, modifies, adjusts or executes one or more of the methods of the present invention as described herein.

Figure 10:
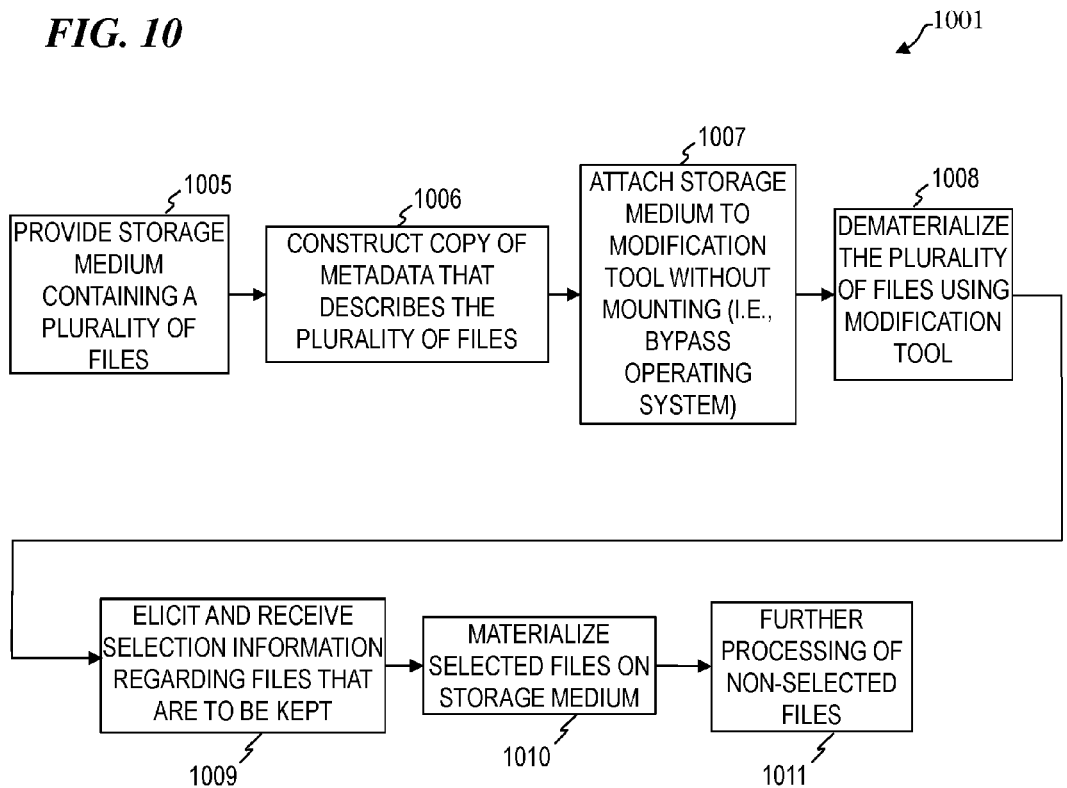
FIG. 10 is a flowchart of a method 1001 for subtractively installing a plurality of files onto a storage medium using the metadata modification embodiments of the present invention.

FIG. 10 is a flowchart of a method 1001 for subtractively installing a plurality of files onto an end-user storage medium using the metadata modification embodiments of the present invention. In some embodiments, the present invention is used as part of a subtractive-installation method such as described in U.S. patent application Ser. No. 11/428,346 filed Jun. 30, 2006 (issued as U.S. Pat. No. 7,398,524 on Jul. 8, 2008) entitled "APPARATUS AND METHOD FOR SUBTRACTIVE INSTALLATION", which is incorporated by reference herein in this application's "CROSS-REFERENCE TO RELATED APPLICATIONS" section, above. For example, in some embodiments, at block 1005, a storage medium (e.g., in some embodiments, an end-user storage medium) containing a plurality of files (e.g., software programs, digital music files, movies, photographs, and the like) is provided (e.g., in some embodiments, the storage medium is loaded with the plurality of files according to embodiments described in U.S. patent application Ser. No. 11/428,346). One method of disseminating lots of data files to users is to allow them to purchase and then download the files. However, downloading a massive amount of data over the Internet is infeasible. For example, at today's fast speeds, downloading one terabyte of data over a 1 GBps network operating at optimum maximal efficiency takes over 24 hours. In comparison, copying data from one disk to another in a single computer system can be done much faster. And whereas computer networks and computers have gotten faster over the years, computer networks remain much slower in data transfers than disk-to-disk transfers on local computers; this principle is sometimes known as the "wagonload of tapes" or "sneakernet" to illustrate that it is often more efficient to transfer a massive amount of data by physically carrying data tapes/disks across the country using a horse-drawn wagon or a person running wearing sneakers. In some embodiments, therefore, the storage medium provided at block 1005 is pre-loaded with the plurality of files in an efficient commercial-production setting, undergoes blocks 1006-1008 at the commercial production setting, the dematerialized storage medium is duplicated to create a plurality of dematerialized storage media at the commercial-production setting, and then the storage media are shipped using conventional non-electronic means to endpoints such as retail stores (in some such embodiments, blocks 1009-1011 are performed at a retail store). This makes a large selection of data available to consumers to buy, as long as the data they do not purchase can be safely and quickly dematerialized from the storage medium.

In some embodiments, at block 1006, a copy of the metadata describing the plurality of files on the storage medium is constructed (e.g., in some embodiments, a copy of the directory information and FAT information associated with each of the plurality of files is constructed). In some embodiments, at block 1007, the storage medium is attached to a modification tool (e.g., the modification tool shown in FIG. 9A). In some embodiments, the modification tool is a computer that is attached such that the storage medium is not mounted, which bypasses the operating system and allows the storage medium to be opened for reading and writing data without expecting, requiring, or locating a metadata structure.

In some embodiments, at block 1008, the storage medium is modified by having the modification tool dematerialize the plurality of files according to one or more of the dematerializing embodiments described herein (see, e.g., FIG. 7A and FIG. 7C). In some embodiments, at block 1009, selection information regarding the files that are to be kept is elicited and received (e.g., in some embodiments, an end-user of the storage medium provides selection information regarding the files that the end-user wishes to be made available to the end-user). In some embodiments, the selection of a file results in the automatic selection of one or more related files, which forms a working set of related files (e.g., selecting a file containing the second movement of a musical performance may result in selecting all movements of the performance). In some embodiments, at block 1010, files selected via block 1009 are materialized based at least in part on the metadata copy generated at block 1006 (in some such embodiments, the materialization is performed by a modification tool that is operatively coupled to the dematerialized storage medium at an endpoint like a retail store). For example, in some embodiments, selected files are made accessible by unzeroing the directory entries associated with the selected files and removing "end-of-file" markers placed in the FAT clusters associated with the selected files. In some embodiments, at block 1011, non-selected files undergo further processing (in some such embodiments, the further processing is performed by a modification tool that is operatively coupled to the storage medium at an endpoint like a retail store). For example, in some embodiments, data space for the non-selected files is made available for other files (e.g., in some embodiments, for files that were dematerialized via directory zeroing, but which were not overwritten due to end-of-file FAT cluster marking, the files are irreversibly dematerialized by traversing and zeroing the FAT-cluster chain to free the blocks of each non-selected file). In some embodiments, at block 1011, the data blocks of the non-selected files are destructively conventionally erased.

While the techniques described herein have been illustrated with several specific, currently widely-used file systems, they are of general application to any file system that manages physical storage.

In some embodiments, the present invention provides a method for modifying a first storage medium having a plurality of files including a first file, the method including providing a first modification tool; operatively coupling the first storage medium to the modification tool, wherein the operatively coupling includes bypassing a first operating system used to access the plurality of files; and dematerializing, using the first modification tool, at least the first file to form one or more dematerialized files.

In some embodiments, the method further includes prior to dematerializing at least the first file, eliciting and receiving selection information that identifies at least the first file as selected for dematerialization, wherein the dematerializing is based at least in part on the received selection information. In some embodiments, the method further includes materializing at least one of the one or more dematerialized files. In some embodiments, the method further includes providing a second modification tool; and materializing, using the second modification tool, at least one of the one or more dematerialized files. In some embodiments, the dematerializing includes dematerializing the plurality of files, the method further including duplicating the first storage medium to produce a plurality of storage media including a second storage medium, each one of the plurality of storage media having the plurality of dematerialized files; eliciting and receiving selection information that identifies files selected for materialization on the second storage medium; and materializing at least one of the plurality of dematerialized files on the second storage medium based at least in part on the received selection information.

In some embodiments of the method, the dematerializing includes dematerializing the plurality of files, the method further including duplicating the first storage medium to produce a plurality of storage media including a second storage medium, each one of the plurality of storage media having the plurality of dematerialized files; eliciting and receiving selection information that identifies files selected for materialization on the second storage medium; providing a second modification tool; and materializing, using the second modification tool, at least a first one of the plurality of dematerialized files on the second storage medium based at least in part on the received selection information. In some embodiments, the method further includes prior to dematerializing: detecting the plurality of files and a first metadata structure describing the plurality of files, and constructing a second metadata structure that describes the plurality of files. In some embodiments, the method further includes prior to dematerializing: detecting the plurality of files and a first metadata structure describing the plurality of files, and constructing a second metadata structure that describes the plurality of files, wherein the second metadata structure is stored on the first modification tool.

In some embodiments, the method further includes prior to dematerializing: detecting the plurality of files and a first metadata structure describing the plurality of files, and constructing a second metadata structure that describes the plurality of files, and materializing at least one of the one or more dematerialized files, wherein the materializing is based at least in part on the second metadata structure. In some embodiments of the method, the dematerializing includes dematerializing the plurality of files, the method further including duplicating the first storage medium to produce a plurality of storage media including a second storage medium, each one of the plurality of storage media having the plurality of dematerialized files; eliciting and receiving selection information that identifies files selected for materialization on the second storage medium; materializing at least a first one of the plurality of dematerialized files on the second storage medium based at least in part on the received selection information; and processing non-selected files, wherein the processing includes overwriting data blocks of the non-selected files with zeroes.

In some embodiments of the method, the first modification tool includes a computer having a second operating system, and wherein the dematerializing is performed using the second operating system. In some embodiments, the modification tool includes a first computer having a second operating system, wherein the dematerializing is performed using the second operating system, and wherein the first computer is distinct from an end-user computer configured to utilize the plurality of files. In some embodiments, the dematerializing includes modifying metadata that describes the at least first file. In some embodiments, the dematerializing includes modifying metadata that describes the at least first file, wherein the metadata includes directory information and file allocation information. In some embodiments, the dematerializing includes modifying directory information that describes the at least first file. In some embodiments, the dematerializing includes modifying directory information that describes the at least first file, wherein the directory information includes a plurality of directory entries including a first directory entry, and wherein the modifying of the directory information includes setting a first byte of the first directory entry to 0xE5 and overwriting remaining bytes of the first directory entry with zeroes. In some embodiments, the dematerializing includes modifying directory information that describes the at least first file, wherein the directory information includes a plurality of directory entries including a first directory entry, and wherein the modifying of the directory information includes setting a first byte of the first directory entry to 0xE5 and overwriting remaining bytes of the first directory entry with random data. In some embodiments, the dematerializing includes modifying directory information that describes the at least first file, wherein the directory information includes a plurality of directory entries including a first directory entry, and wherein the modifying of the directory information includes setting a first byte of the first directory entry to 0xE5 and overwriting remaining bytes of the first directory entry with ones.

In some embodiments of the method, the first storage medium includes metadata describing the plurality of files, wherein the plurality of files is stored in a FAT system such that the metadata describing the at least first file includes one or more FAT clusters, wherein the dematerializing includes placing an end-of-file marker on each of the one or more FAT clusters. In some embodiments, the first storage medium includes metadata describing the plurality of files, wherein the plurality of files is stored in a FAT system such that the metadata describing the at least first file includes one or more FAT clusters, wherein the metadata further includes directory information that describes the at least first file, wherein the directory information includes a plurality of directory entries including a first directory entry, and wherein the dematerializing includes: setting a first byte of the first directory entry to 0xE5 and overwriting remaining bytes of the first directory entry with zeroes, and placing an end-of-file marker on each of the one or more FAT clusters.

In some embodiments, the present invention provides a method for modifying a first storage medium having a plurality of files including a first file, the method including providing a first modification tool; operatively coupling the first storage medium to the modification tool, wherein the operatively coupling includes bypassing a first operating system used to access the plurality of files; and irreversibly dematerializing, using the first modification tool, at least the first file to form one or more irreversibly dematerialized files.

In some embodiments of the method, the first storage medium includes metadata describing the plurality of files, wherein the plurality of files is stored in a FAT system such that the metadata describing the at least first file includes one or more FAT clusters, wherein the metadata further includes directory information that describes the at least first file, wherein the directory information includes a plurality of directory entries including a first directory entry, and wherein the irreversibly dematerializing includes: setting a first byte of the first directory entry to 0xE5 and overwriting remaining bytes of the first directory entry with zeroes, and overwriting each of the one or more FAT clusters with zeroes.

In some embodiments, the present invention provides a method for modifying a first storage medium having a plurality of files including a first file, the method including providing a first modification tool; operatively coupling the first storage medium to the modification tool; and irreversibly dematerializing, using the first modification tool, at least the first file to form one or more irreversibly dematerialized files.

In some embodiments, the present invention provides a modification system for modifying a first storage medium having a plurality of files including a first file, the system including a first modification tool that includes: an attachment module configured to operatively couple the modification tool to the first storage medium such that a first operating system used to access the plurality of files is bypassed; and a dematerialization module configured to dematerialize at least the first file to form one or more dematerialized files. In some embodiments, the system further comprises a communication module operatively coupled to the first modification tool and configured to elicit and receive selection information that identifies at least the first file as selected for dematerialization, wherein the dematerialization module is configured to dematerialize at least the first file based at least in part on the received selection information. In some embodiments, the system further comprises a materialization module operatively coupled to the first storage medium and configured to materialize at least one of the one or more dematerialized files. In some embodiments, the system further comprises a second modification tool that includes: a materialization module operatively coupled to the first storage medium and configured to materialize at least one of the one or more dematerialized files.

In some embodiments of the system, the dematerialization module is configured to dematerialize the plurality of files, the system further including a duplicator configured to duplicate the first storage medium to produce a plurality of storage media including a second storage medium, each one of the plurality of storage media having the plurality of dematerialized files; a communication module operatively coupled to the first modification tool and configured to elicit and receive selection information that identifies files selected for materialization on the second storage medium; a materialization module operatively coupled to the second storage medium and configured to materialize at least one of the plurality of dematerialized files based at least in part on the received selection information. In some embodiments, the dematerialization module is configured to dematerialize the plurality of files, the system further including a duplicator configured to duplicate the first storage medium to produce a plurality of storage media including a second storage medium, each one of the plurality of storage media having the plurality of dematerialized files; a communication module operatively coupled to the first modification tool and configured to elicit and receive selection information that identifies files selected for materialization on the second storage medium; and a second modification tool that includes: a materialization module operatively coupled to the second storage medium and configured to materialize at least one of the plurality of dematerialized files based at least in part on the received selection information.

In some embodiments of the system, the dematerialization module includes a detection module configured to detect the plurality of files and a first metadata structure that describes the plurality of files; a construction module configured to construct a second metadata structure that describes the plurality of files, the system further including a materialization module configured to materialize at least one of the one or more dematerialized files based at least in part on the second metadata structure. In some embodiments, the dematerialization module is configured to dematerialize the plurality of files, the system further including a duplicator configured to duplicate the first storage medium to produce a plurality of storage media including a second storage medium, each one of the plurality of storage media having the plurality of dematerialized files; a communication module operatively coupled to the first modification tool and configured to elicit and receive selection information that identifies files selected for materialization on the second storage medium; a materialization module operatively coupled to the second storage medium and configured to materialize at least one of the plurality of dematerialized files based at least in part on the received selection information, wherein the materialization module is further configured to process non-selected files such that data blocks of the non-selected files are overwritten with zeroes.

In some embodiments of the system, the first modification tool includes a computer having a second operating system, wherein the dematerialization module is operated by the second operating system. In some embodiments, the dematerialization performed by the dematerialization module includes modification of metadata that describes the at least first file, wherein the metadata includes directory information and file-allocation information. In some embodiments, the dematerialization performed by the dematerialization module includes modification of directory information that describes the at least first file, wherein the directory information includes a plurality of directory entries including a first directory entry, and wherein the modification of the directory information includes setting a first byte of the first directory entry to 0xE5 and overwriting remaining bytes of the first directory entry with zeroes. In some embodiments, the first storage medium includes metadata that describes the plurality of files, wherein the plurality of files is stored in a FAT system such that the metadata that describes the at least first file includes one or more FAT clusters, wherein the dematerialization performed by the dematerialization module includes placement of an end-of-file marker on each of the one or more FAT clusters. In some embodiments, the first storage medium includes metadata that describes the plurality of files, wherein the plurality of files is stored in a FAT system such that the metadata that describes the at least first file includes one or more FAT clusters, wherein the metadata further includes directory information that describes the at least first file, wherein the directory information includes a plurality of directory entries including a first directory entry, and wherein the dematerialization module is further configured dematerialize such that: a first byte of the first directory entry is set to 0xE5 and remaining bytes of the first directory entry are overwritten with zeroes, and each of the one or more FAT clusters is marked as end of file.

In some embodiments, the present invention provides a modification system for modifying a first storage medium having a plurality of files including a first file, the system including a first modification tool that includes: an attachment module configured to operatively couple the modification tool to the first storage medium such that a first operating system used to access the plurality of files is bypassed; an irreversible dematerialization module configured to irreversibly dematerialize at least the first file to form one or more irreversibly dematerialized files. In some embodiments, the first storage medium includes metadata that describes the plurality of files, wherein the plurality of files is stored in a FAT system such that the metadata that describes the at least first file includes one or more FAT clusters, wherein the metadata further includes directory information that describes the at least first file, wherein the directory information includes a plurality of directory entries including a first directory entry, and wherein the irreversible dematerialization module is further configured irreversibly dematerialize such that: a first byte of the first directory entry is set to 0xE5 and remaining bytes of the first directory entry are overwritten with zeroes, and each of the one or more FAT clusters is overwritten with zeroes.

In some embodiments, the present invention provides a non-transitory computer-readable medium having instructions stored thereon for causing a suitably programmed modification computer to execute a method for modifying a first storage medium having a plurality of files including a first file, the method including operatively coupling the first storage medium to the modification tool, wherein the operatively coupling includes bypassing a first operating system used to access the plurality of files; and dematerializing at least the first file to form one or more dematerialized files.

In some embodiments, the computer-readable medium further includes instructions such that the method further includes prior to dematerializing at least the first file, eliciting and receiving selection information that identifies at least the first file as selected for dematerialization, wherein the dematerializing is based at least in part on the received selection information. In some embodiments, the computer-readable medium further includes instructions such that the method further comprises materializing at least one of the one or more dematerialized files. In some embodiments, the computer-readable medium further includes instructions such that dematerializing includes dematerializing the plurality of files, the computer-readable medium further comprising instructions such that the method further including: duplicating the first storage medium to produce a plurality of storage media including a second storage medium, each one of the plurality of storage media having the plurality of dematerialized files; eliciting and receiving selection information that identifies files selected for materialization on the second storage medium; and materializing at least one of the plurality of dematerialized files on the second storage medium based at least in part on the received selection information.

In some embodiments, the computer-readable medium further includes instructions such that the method further includes prior to dematerializing: detecting the plurality of files and a first metadata structure describing the plurality of files, and constructing a second metadata structure that describes the plurality of files. In some embodiments, the computer-readable medium further includes instructions such that the method further includes prior to dematerializing: detecting the plurality of files and a first metadata structure describing the plurality of files, and constructing a second metadata structure that describes the plurality of files, and materializing at least one of the one or more dematerialized files, wherein the materializing is based at least in part on the second metadata structure. In some embodiments, the computer-readable medium further includes instructions such that the dematerializing includes dematerializing the plurality of files, the computer-readable medium further comprising instructions such that the method further includes duplicating the first storage medium to produce a plurality of storage media including a second storage medium, each one of the plurality of storage media having the plurality of dematerialized files; eliciting and receiving selection information that identifies files selected for materialization on the second storage medium; materializing at least a first one of the plurality of dematerialized files on the second storage medium based at least in part on the received selection information; and processing non-selected files, wherein the processing includes overwriting data blocks of the non-selected files with zeroes.

In some embodiments, the computer-readable medium further includes instructions such that the dematerializing includes modifying directory information that describes the at least first file, wherein the directory information includes a plurality of directory entries including a first directory entry, and wherein the modifying of the directory information includes setting a first byte of the first directory entry to 0xE5 and overwriting remaining bytes of the first directory entry with zeroes. In some embodiments of the computer-readable medium, the first storage medium includes metadata describing the plurality of files, wherein the plurality of files is stored in a FAT system such that the metadata describing the at least first file includes one or more FAT clusters, wherein the computer-readable medium further includes instructions such that the dematerializing includes placing an end-of-file marker on each of the one or more FAT clusters. In some embodiments of the computer-readable medium, the first storage medium includes metadata describing the plurality of files, wherein the plurality of files is stored in a FAT system such that the metadata describing the at least first file includes one or more FAT clusters, wherein the metadata further includes directory information that describes the at least first file, wherein the directory information includes a plurality of directory entries including a first directory entry, and wherein the computer-readable medium further includes instructions such that the dematerializing includes: setting a first byte of the first directory entry to 0xE5 and overwriting remaining bytes of the first directory entry with zeroes, and placing an end-of-file marker on each of the one or more FAT clusters.

In some embodiments, the present invention provides a non-transitory computer-readable medium having instructions stored thereon for causing a suitably programmed modification computer to execute a method for modifying a first storage medium having a plurality of files including a first file, the method including operatively coupling the first storage medium to the modification tool, wherein the operatively coupling includes bypassing a first operating system used to access the plurality of files; and irreversibly dematerializing at least the first file to form one or more irreversibly dematerialized files.

In some embodiments, the present invention provides a method for modifying a storage medium having a plurality of files including a first file and a second file, the method including providing a modification tool; operatively coupling the storage medium to the modification tool, wherein the operatively coupling includes bypassing a first operating system used to access the plurality of files; dematerializing, using the modification tool, at least the first file to form one or more dematerialized files; and materializing, using the modification tool, at least one of the one or more dematerialized files.

In some embodiments, the method further includes, prior to materializing the at least one dematerialized file, eliciting and receiving selection information identifying the first file as selected to be materialized. In some embodiments, the dematerializing includes dematerializing the plurality of files.

In some embodiments, the present invention provides a method for modifying a storage medium having a plurality of files including a first file and a second file, the method including providing a modification tool; operatively coupling the storage medium to the modification tool, wherein the operatively coupling includes bypassing a first operating system used to access the plurality of files; and dematerializing, using the modification tool, at least the first file to form one or more dematerialized files. In some embodiments, the method further includes, prior to dematerializing at least the first file, eliciting and receiving selection information identifying the first file as selected to be dematerialized.

In some embodiments, the present invention provides a method of modifying normal availability of a plurality of digital assets contained on a storage volume including severing, using a first operating system, substantially all linkages and information referring to the plurality of digital assets.

In some embodiments of the method, the severing is done while a second operating system to be used in accessing the plurality of digital assets is substantially bypassed or inoperative. In some embodiments, the first operating system used to modify the availability of the plurality of digital assets does not mount the storage volume containing the digital assets. In some embodiments, the first operating system used to modify the availability of the plurality of digital assets executes on a computer distinct from an end-user device used to utilize the plurality of digital assets. In some embodiments, the digital assets are stored in a FAT system such that each of the digital assets is described by one or more FAT clusters, and wherein the severing includes placing an end-of-file marker on the one or more FAT clusters for each of the digital assets.

In some embodiments, the present invention provides a method for modifying a storage medium having a plurality of files including a first file, a second file, and a third file, the method including providing a modification tool; operatively coupling the storage medium to the modification tool, wherein the operatively coupling includes bypassing a first operating system used to access the plurality of files; and altering metadata associated with at least the first file using the modification tool.

In some embodiments of the method, the modification tool includes a first computer. In some embodiments, the modification tool includes a first computer having a second operating system that is configured to perform the altering of the metadata. In some embodiments, the modification tool includes a first computer, wherein the first computer is distinct from an end-user computer configured to utilize the plurality of files. In some embodiments, the metadata includes directory information describing the first file. In some embodiments, the metadata includes directory information describing the first file, wherein the altering includes dematerializing the directory information. In some embodiments, the metadata includes directory information describing the first file, wherein the altering includes dematerializing the directory information, and wherein the dematerializing of the directory information includes overwriting all directory entries in the directory information with zeroes (or another pattern).

In some embodiments of the method, the plurality of files is stored in a FAT system such that the metadata associated with the first file includes one or more FAT clusters, wherein the altering includes placing an end-of-file marker on each of the one or more FAT clusters. In some embodiments, the plurality of files is stored in a FAT system such that the metadata associated with the first file includes one or more FAT clusters, wherein the altering includes overwriting each of the one or more FAT clusters with zeroes (or another pattern).

In some embodiments of the method, the metadata includes a first set of directory information describing the first file, and wherein the altering includes creating a second set of directory information that describes the first file on the storage medium and dematerializing the first set of directory information.

In some embodiments, the present invention provides a method for modifying a storage medium having a plurality of files including a first file, a second file, and a third file, the method including bypassing a first operating system used to access the plurality of files; and altering metadata associated with at least the first file. In some embodiments, the bypassing includes providing a Basic Input Output System (BIOS), and wherein the altering of the metadata is performed by the BIOS. In some embodiments, the bypassing includes queuing routines associated with the altering of the metadata to be performed prior to initialization of the first operating system.

In some embodiments, the present invention provides a modification tool for modifying a storage medium having a plurality of files including a first file, a second file, and a third file, the tool including an attachment module configured to operatively couple the modification tool to the storage medium such that a first operating system used to access the plurality of files is bypassed; and an alteration module configured to alter metadata associated with at least the first file.

In some embodiments of the tool, the modification tool is a first computer. In some embodiments, the modification tool is a first computer that has a second operating system, and wherein the alteration module is operated by the second operation system. In some embodiments, the modification tool is a first computer that is distinct from an end-user computer configured to utilize the plurality of files. In some embodiments, the metadata includes directory information that describes the first file. In some embodiments, the metadata includes directory information that describes the first file, wherein the alteration module is further configured to erase the directory information. In some embodiments, the metadata includes directory information that describes the first file, wherein the alteration module is further configured to erase the directory information such that all directory entries in the directory information are overwritten with zeroes (or another pattern).

In some embodiments of the tool, the plurality of files is stored in a FAT system such that the metadata associated with the first file includes one or more FAT clusters, wherein the alteration module is further configured to place an end-of-file marker on each of the one or more FAT clusters. In some embodiments, the plurality of files is stored in a FAT system such that the metadata associated with the first file includes one or more FAT clusters, and wherein the alteration module is further configured to overwrite each of the one or more FAT clusters with zeroes (or another pattern).

In some embodiments, the metadata includes a first set of directory information that describes the first file, wherein the alteration modules is further configured to: create a second set of directory information that describes the first file on the storage medium, and erase the first set of directory information.

In some embodiments, the present invention provides an apparatus for modifying a storage medium having a plurality of files including a first file, a second file, and a third file, the apparatus including a bypass module configured to bypass a first operating system used to access the plurality of files; and an alteration module configured to alter metadata associated with at least the first file.

In some embodiments, the present invention provides a non-transitory computer-readable medium having instructions stored thereon for causing a suitably programmed modification computer to execute a method for modifying a storage medium having a plurality of files including a first file, a second file, and a third file, the method including bypassing a first operating system used to access the plurality of files; and altering metadata associated with at least the first file.

In some embodiments of the computer-readable medium, the modification computer includes a second operating system that executes the altering of the metadata. In some embodiments, the modification computer is distinct from an end-user computer configured to utilize the plurality of files. In some embodiments, the metadata includes directory information describing the first file, wherein the computer-readable medium further comprises instructions such that the altering includes dematerializing the directory information. In some embodiments, the metadata includes directory information describing the first file, wherein the computer-readable medium further comprises instructions such that the altering includes overwriting all directory entries in the directory information with zeroes (or another pattern). In some embodiments, the plurality of files is stored in a FAT system such that the metadata associated with the first file includes one or more FAT clusters, wherein the computer-readable medium further comprises instructions such that the altering includes placing an end-of-file marker on each of the one or more FAT clusters. In some embodiments, the plurality of files is stored in a FAT system such that the metadata associated with the first file includes one or more FAT clusters, wherein the computer-readable medium further comprises instructions such that the altering includes overwriting each of the one or more FAT clusters with zeroes (or another pattern).

In some embodiments of the computer-readable medium, the metadata includes a first set of directory information describing the first file, and wherein the computer-readable medium further comprises instructions such that altering includes creating a second set of directory information that describes the first file on the storage medium and dematerializing the first set of directory information.

In some embodiments, the present invention provides a computer-implemented method for distributing customized content using a first storage medium having a plurality of software programs stored therein, wherein the plurality of software programs includes at least a first subset and a second subset, the method including obtaining a set of metadata describing the plurality of software programs, wherein the set of metadata includes directory information that identifies locations on the first storage medium at which the plurality of software programs are stored; receiving selection data that distinguish the first subset of the plurality of software programs that is to be unavailable for use by an end user from the second subset of the plurality of software programs, wherein the second subset of the plurality of software programs are selected software programs that are to be retained and available as software programs for the end user; automatically modifying the first storage medium based on the selection data such that, in place of those software programs not relevant to the selected software programs, dematerialized space becomes available for storage of other data, and automatically modifying a portion of the set of metadata into modified directory information metadata, wherein the modified directory information metadata corresponds to the second subset of the plurality of software programs to be retained; and writing the modified directory information metadata into storage locations used by an operating system for access to the retained software programs such that those selected software programs specified by the selection data are available as software programs.

In some embodiments of the method, the automatically modifying the first storage medium includes performing a metadata-modification operation that includes overwriting the directory information that would otherwise allow reconstruction of the first subset of the plurality of software programs. In some embodiments, the method further includes providing a master storage medium; installing a plurality of software programs to the master storage medium; copying, to the first storage medium, data from the master storage medium that includes the plurality of software programs. In some embodiments, the method further includes operatively coupling the first storage medium to an end-user device for a first time after the writing of the modified directory information metadata. In some embodiments, the method further includes operatively coupling the first storage medium to an end-user device for a first time before the receiving of the selection data. In some embodiments of the method, the obtaining of the set of metadata describing the plurality of software programs includes obtaining the set of metadata describing the plurality of software programs from the first storage medium. In some embodiments, the method further includes charging a monetary amount to a predetermined account based on the received selection data.

In some embodiments, the present invention provides an apparatus that includes a processor; a first storage medium that has a plurality of software programs stored therein, wherein the plurality of software programs includes at least a first subset and a second subset; a set of metadata that describes the plurality of software programs, wherein the set of metadata includes directory information that identifies locations on the first storage medium at which the plurality of software programs are stored; a receiver operatively coupled to the processor and configured to receive selection data that distinguish the first subset of the plurality of software programs that is to be unavailable for use by an end user from the second subset of the plurality of software programs, wherein the second subset of the plurality of software programs are selected software programs that are to be retained and available as software programs for the end user; and a grypher that executes in the processor and that is operatively coupled to the first storage medium, wherein the grypher is operable to automatically modify the first storage medium based on the selection data such that, in place of those software programs not relevant to the selected software programs, dematerialized space becomes available for storage of other data, wherein the grypher is further operable to automatically modify a portion of the set of metadata into modified directory information metadata, wherein the modified directory information metadata corresponds to the second subset of the plurality of software programs to be retained, and wherein the grypher is further operable to write the modified directory information metadata into storage locations used by an operating system for access to the retained software programs such that those selected software programs specified by the selection data are available as software programs.

In some embodiments of the apparatus, the automatic modification of the first storage medium performed by the grypher includes a metadata-modification operation that overwrites the directory information that would otherwise allow reconstruction of the first subset of the plurality of software programs. In some embodiments, the apparatus further includes a master storage medium that has a plurality of software programs stored therein; and a copy module operable to copy, to the first storage medium, data from the master storage medium that includes the plurality of software programs. In some embodiments, the apparatus further includes an end-user device, wherein the first storage medium is operatively coupled to the end-user device for a first time after the grypher writes the modified directory information metadata into storage locations used by the operating system for access to the retained software programs. In some embodiments, the apparatus further includes an end-user device, wherein the first storage medium is operatively coupled to the end-user device for a first time before the receiver receives the selection data. In some embodiments, the set of metadata that describes the plurality of software programs is also stored on the first storage medium. In some embodiments, the apparatus further includes a charge program operable to charge a monetary amount to a predetermined account based on the received selection data.

In some embodiments, the present invention provides an apparatus that includes a processor; a first storage medium that has a plurality of software programs stored therein, wherein the plurality of software programs includes at least a first subset and a second subset; a set of metadata that describes the plurality of software programs, wherein the set of metadata includes directory information that identifies locations on the first storage medium at which the plurality of software programs are stored; means for receiving selection data that distinguish the first subset of the plurality of software programs that is to be unavailable for use by an end user from the second subset of the plurality of software programs, wherein the second subset of the plurality of software programs are selected software programs that are to be retained and available as software programs for the end user; means for automatically modifying the first storage medium based on the selection data such that, in place of those software programs not relevant to the selected software programs, dematerialized space becomes available for storage of other data, and for automatically modifying a portion of the set of metadata into modified directory information metadata, wherein the modified directory information metadata corresponds to the second subset of the plurality of software programs to be retained; and means for writing the modified directory information metadata into storage locations used by an operating system for access to the retained software programs such that those selected software programs specified by the selection data are available as software programs.

In some embodiments of the apparatus, the means for automatically modifying the first storage medium includes means for performing a metadata-modification operation that includes means for overwriting the directory information that would otherwise allow reconstruction of the first subset of the plurality of software programs. In some embodiments, the apparatus further includes a master storage medium; means for installing a plurality of software programs to the master storage medium; and means for copying, to the first storage medium, data from the master storage medium that includes the plurality of software programs. In some embodiments, the first storage medium is coupled to an end-user device for a first time after the means for writing the modified directory information metadata performs its function. In some embodiments, the first storage medium is coupled to an end-user device for a first time before the means for receiving selection data performs its function. In some embodiments, the apparatus further includes means for charging a monetary amount to a predetermined account based on the received selection data.

Although the present invention primarily discusses FAT as an example, a person of ordinary skill in the art appreciates that a file system may be implemented on multiple operating systems. For example, most operating systems support a FAT-based file system; Linux supports FFS, UFS, and NTFS; OS X supports HFS+, FAT, and NTFS; etc. Further, a person of ordinary skill in the art appreciates that a file system may manage data on any non-volatile and volatile, read-write or read-only storage medium such as magnetic hard drives, floppies, CDs and DVDs, Flash, RAM, networks and cloud servers, tapes, Shingled devices, Phase Change Memory devices, and the like. Still further, file systems may contain multiple types of objects that can be operated on, including as disclosed in this invention: regular files, folders/directories, symbolic links, hard links, character and block device files, special pipes or sockets, and more.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). Further, some embodiments include fewer than all the components described as part of any one of the embodiments described herein. Still further, it is specifically contemplated that the present invention includes embodiments having combinations and subcombinations of the various embodiments described herein and the various embodiments described by the related applications incorporated by reference above, in the "CROSS-REFERENCE TO RELATED APPLICATIONS" section of the present application.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method for modifying a first storage medium having a plurality of files including a first file that includes a plurality of data blocks, wherein the first storage medium includes a first metadata structure that describes the plurality of files, the method comprising:
   providing a first modification tool;
   operatively coupling the first storage medium to the modification tool;
   constructing a second metadata structure that describes the plurality of files;
   dematerializing, using the first modification tool, at least the first file to form one or more dematerialized files, wherein the dematerializing of the at least first file includes:
      rendering the first file inaccessible without destroying the plurality of data blocks of the first file and without releasing the plurality of data blocks of the first file for reallocation, and
      modifying directory information that describes the at least first file; and
   materializing at least one of the one or more dematerialized files, wherein the materializing includes modifying the first metadata structure based at least in part on the second metadata structure.

2. The method of claim 1, wherein the directory information includes a plurality of directory entries including a first directory entry, and wherein the modifying of the directory information includes setting a first byte of the first directory entry to 0xE5 and overwriting remaining bytes of the first directory entry with zeroes.

3. The method of claim 1, wherein the plurality of files are utilized by an end-user computer having a first operating system, wherein the modification tool includes a first computer having a second operating system, wherein the dematerializing is performed using the second operating system, and wherein the first computer is distinct from the end-user computer.

4. The method of claim 1, further comprising:
   prior to dematerializing at least the first file, eliciting and receiving selection information that identifies at least the first file as selected for dematerialization, wherein the dematerializing is based at least in part on the received selection information.

5. The method of claim 1, wherein the dematerializing includes dematerializing the plurality of files, the method further comprising:
   duplicating the first storage medium to produce a plurality of storage media including a second storage medium, each one of the plurality of storage media having the plurality of dematerialized files;
   eliciting and receiving selection information that identifies files selected for materialization on the second storage medium; and
   materializing at least one of the plurality of dematerialized files on the second storage medium based at least in part on the received selection information.

6. The method of claim 1, wherein the plurality of files is stored using a FAT file system such that the first metadata structure describing the at least first file includes one or more FAT clusters, wherein the dematerializing includes placing an end-of-file marker on each of the one or more FAT clusters.

7. The method of claim 1, wherein the operatively coupling includes bypassing a file system component of a first operating system used to manipulate the plurality of files.

8. A modification system for modifying a first storage medium having a plurality of files that includes a first file, wherein the first file includes a plurality of data blocks, wherein the first storage medium includes a first metadata structure that describes the plurality of files, the system comprising:
a first modification tool that includes:
an attachment module configured to operatively couple the modification tool to the first storage medium;
a construction module configured to construct a second metadata structure that describes the plurality of files;
a dematerialization module configured to dematerialize at least the first file to form one or more dematerialized files, wherein the dematerialization module is further configured to, as part of the dematerialization, render the first file inaccessible but not destroy the plurality of data blocks of the first file nor release the plurality of data blocks of the first file for reallocation; and
a first materialization module operatively coupled to the first storage medium and configured to modify the first metadata structure based at least in part on the second metadata structure in order to materialize at least one of the one or more dematerialized files.

9. The system of claim 8, wherein the plurality of files are utilized by an end-user computer having a first operating system, wherein the first modification tool includes a computer having a second operating system, and wherein the first dematerialization module is operated by the second operating system.

10. The system of claim 8, wherein the dematerialization performed by the first dematerialization module includes modification of directory information that describes the at least first file, wherein the directory information includes a plurality of directory entries including a first directory entry, and wherein the modification of the directory information includes setting a first byte of the first directory entry to 0xE5 and overwriting remaining bytes of the first directory entry with zeroes.

11. The system of claim 8, wherein the plurality of files is stored using a FAT file system such that the first metadata structure that describes the at least first file includes one or more FAT clusters, wherein the dematerialization performed by the first dematerialization module includes placement of an end-of-file marker on each of the one or more FAT clusters.

12. The system of claim 8, further comprising a communication module operatively coupled to the first modification tool and configured to elicit and receive selection information that identifies at least the first file as selected for dematerialization, wherein the first dematerialization module is configured to dematerialize at least the first file based at least in part on the received selection information.

13. The system of claim 8, wherein the dematerialization module is configured to dematerialize the plurality of files, the system further comprising:
a duplicator configured to duplicate the first storage medium to produce a plurality of storage media including a second storage medium, each one of the plurality of storage media having the plurality of dematerialized files;
a communication module operatively coupled to the first modification tool and configured to eliciting and receive selection information that identifies files selected for materialization on the second storage medium; and
a second materialization module operatively coupled to the second storage medium and configured to materialize at least one of the plurality of dematerialized files on the second storage medium based at least in part on the received selection information.

14. A non-transitory computer-readable medium having instructions stored thereon for causing a suitably programmed modification computer to execute a method for modifying a first storage medium having a plurality of files including a first file that includes a plurality of data blocks, wherein the first storage medium includes a first metadata structure that describes the plurality of files, the method comprising:
operatively coupling the first storage medium to the modification computer;
constructing a second metadata structure that describes the plurality of files;
dematerializing at least the first file to form one or more dematerialized files, wherein the dematerializing of the at least first file includes:
rendering the first file inaccessible without destroying the plurality of data blocks of the first file and without releasing the plurality of data blocks of the first file for reallocation, and
modifying directory information that describes the at least first file; and
materializing at least one of the one or more dematerialized files, wherein the materializing includes modifying the first metadata structure based at least in part on the second metadata structure.

15. The computer-readable medium of claim 14, wherein the plurality of files is stored using a FAT file system such that the first metadata structure describing the at least first file includes one or more FAT clusters, the computer-readable medium further comprising instructions such that the dematerializing includes placing an end-of-file marker on each of the one or more FAT clusters.

16. The computer-readable medium of claim 14, further comprising instructions such that the method further comprises:
prior to dematerializing at least the first file, eliciting and receiving selection information that identifies at least the first file as selected for dematerialization, wherein the dematerializing is based at least in part on the received selection information.

17. The computer-readable medium of claim 14, further comprising instructions such that dematerializing includes dematerializing the plurality of files, the computer-readable medium further comprising instructions such that the method further comprises:
duplicating the first storage medium to produce a plurality of storage media including a second storage medium, each one of the plurality of storage media having the plurality of dematerialized files;
eliciting and receiving selection information that identifies files selected for materialization on the second storage medium; and
materializing at least one of the plurality of dematerialized files on the second storage medium based at least in part on the received selection information.

18. The computer-readable medium of claim 14, further comprising instructions such that the directory information includes a plurality of directory entries including a first directory entry, and the modifying of the directory information includes setting a first byte of the first directory entry to 0xE5 and overwriting remaining bytes of the first directory entry with zeroes.

19. The computer-readable medium of claim 14, wherein the plurality of files are utilized by an end-user computer, and wherein the modification computer is distinct from the end-user computer.

20. The computer-readable medium of claim 14, wherein the plurality of files are utilized by an end-user computer, and wherein the modification computer is distinct from the end-user computer, the method further comprising instructions such that the constructing of the second metadata structure includes storing the second metadata structure on the modification computer.

* * * * *